(12) United States Patent
Yamamoto et al.

(10) Patent No.: US 7,835,854 B2
(45) Date of Patent: Nov. 16, 2010

(54) CONDITION DETECTION AND DISPLAY SYSTEM, CONDITION DETECTION AND DISPLAY METHOD, CONTROL PROGRAM FOR CONDITION DETECTION AND DISPLAY SYSTEM, AND STORAGE MEDIUM STORING THE CONTROL PROGRAM

(75) Inventors: Takeshi Yamamoto, Soraku-gun (JP); Aki Miake, Nara (JP); Toshiya Takahashi, Soraku-gun (JP); Megumi Itoh, Nara (JP); Mitsukazu Okuda, Ikoma (JP); Takeshi Doi, Kashiwara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1123 days.

(21) Appl. No.: 10/598,094

(22) PCT Filed: Feb. 15, 2005

(86) PCT No.: PCT/JP2005/002685

§ 371 (c)(1),
(2), (4) Date: Aug. 17, 2006

(87) PCT Pub. No.: WO2005/080120

PCT Pub. Date: Sep. 1, 2005

(65) Prior Publication Data

US 2009/0112389 A1    Apr. 30, 2009

(30) Foreign Application Priority Data

Feb. 20, 2004   (JP) ............................. 2004-045407

(51) Int. Cl.
G08G 1/16   (2006.01)

(52) U.S. Cl. ........................ 701/117; 701/300; 701/301; 340/435; 340/438

(58) Field of Classification Search .................... 701/29, 701/36, 93, 96, 116, 117, 118, 119, 300, 701/301, 302; 345/156
See application file for complete search history.

(56) References Cited

U.S. PATENT DOCUMENTS 5,471,205 A * 11/1995 Izawa ..................... 340/995.27

(Continued)

FOREIGN PATENT DOCUMENTS

JP       07-172214 A       7/1995

(Continued)

OTHER PUBLICATIONS

International Search Report issued in the corresponding International Application No. PCT/JP2005/002685, mailed on May 31, 2005.

*Primary Examiner*—Khoi Tran
*Assistant Examiner*—Spencer Patton
(74) *Attorney, Agent, or Firm*—Keating & Bennett, LLP

(57) ABSTRACT

In a condition detection and display system (100), an omni-directional camera (1), internal condition sensors (3), external condition sensors (4), and others detect a condition of a vehicle and surroundings around the vehicle, image data which is a detection result obtained by the aforesaid members and contains an image of the vehicle is selected from an image database (6), and the selected image data is displayed on a liquid crystal panel (7) at a position close to a display of a speedometer.

16 Claims, 10 Drawing Sheets

U.S. PATENT DOCUMENTS

| | | |
|---|---|---|
| 2002/0154217 A1 | 10/2002 | Ikeda |
| 2003/0004616 A1* | 1/2003 | Obradovich et al. ............ 701/1 |
| 2004/0236507 A1* | 11/2004 | Maruyama et al. .......... 701/208 |

FOREIGN PATENT DOCUMENTS

| | | | | |
|---|---|---|---|---|
| JP | 07172214 A | * | 7/1995 | |
| JP | 08-193831 A | | 7/1996 | |
| JP | 11-271441 A | | 10/1999 | |
| JP | 2000-072019 A | | 3/2000 | |
| JP | 2001-039217 A | | 2/2001 | |
| JP | 2001-101593 A | | 4/2001 | |
| JP | 2001101593 A | * | 4/2001 | |
| JP | 2002-319091 A | | 10/2002 | |
| JP | 2002-350193 A | | 12/2002 | |
| JP | 2003-252151 A | | 9/2003 | |
| JP | 2003-255340 A | | 9/2003 | |
| JP | 2003255340 A | * | 9/2003 | |

* cited by examiner

CONDITION DETECTION AND DISPLAY SYSTEM, CONDITION DETECTION AND DISPLAY METHOD, CONTROL PROGRAM FOR CONDITION DETECTION AND DISPLAY SYSTEM, AND STORAGE MEDIUM STORING THE CONTROL PROGRAM

TECHNICAL FIELD

The present invention relates to a condition detection and display system, which is provided in traveling means such as a vehicle, for notifying a driver of information on the traveling means and surroundings around the traveling means, a condition detection and display method, a control program for condition detection and display system, storage medium storing the control program.

BACKGROUND ART

In recent years, many systems have been proposed, for example, in which various kinds of sensors are provided in a vehicle and information detected by the sensors is notified to a driver. For example, Patent Document 1 discloses a parking aiding device for teaching a driver in a vehicle a driving operation quantity for parking the vehicle in a desired parking section.

Further, for example, Patent Document 2 discloses a vehicle-use confirmation device in which an imaging device captures information on surroundings around a vehicle or the like, and projects the information as a camera image on a monitor device for checking the surroundings around the vehicle.

The Patent Document 1 is Japanese Laid-Open Patent Publication No. 72019/2000 (Tokukai 2000-72019; published on Mar. 7, 2000).

The Patent Document 2 is Japanese Laid-Open Patent Publication No. 39217/2001 (Tokukai 2001-39217; published on Feb. 13, 2001).

In normal circumstances, a driver in a vehicle or the like must drive while checking a situation in front of the vehicle and a speed of the vehicle through a speedometer. In addition, the driver must change a lane and turn to the left or right while checking a situation on the sides and back of the vehicle with driver's eyes or through door mirrors (fender mirrors) or a room mirror.

However, in the conventional art, information to provide to the driver is given at a position different from that of the speedometer, which increases the number of positions to which the driver's viewpoint moves for checking such information in driving. This could increase eyestrain of the driver and cause the driver to miss displayed information.

The present invention has been attained in view of the above problems, and an object of the present invention is to provide a condition detection and display system, provided in traveling means such as a vehicle, for detecting a condition of the traveling means and surroundings around the vehicle and notifying a driver of detection results, wherein the driver checks displays regarding the condition of the traveling means and surroundings around the traveling means without increase in the number of times the driver's viewpoint moves.

DISCLOSURE OF INVENTION

In order to achieve the above object, a condition detection and display system of the present invention is a condition detection and display system, provided in traveling means that needs operation of a driver for traveling, for detecting a condition of the traveling means and surroundings around the traveling means and notifying the driver of detected condition of the traveling means and surroundings around the traveling means, the system comprising: display means for displaying images showing the condition of the traveling means and the surroundings around the traveling means, and a speedometer that gives readouts on speed of the traveling means, wherein: the images showing the condition of the traveling means and the surroundings around the traveling means are displayed at a position close to the speedometer.

Examples of the above display manner include a display manner that the speedometer is displayed around a periphery or a part of the periphery of the images showing the condition of the traveling means and the surroundings around the traveling means. The condition detection display system preferably includes a database storing the images showing the condition of the traveling means and surroundings around the traveling means.

According to the above arrangement, the images showing the condition of the traveling means and surroundings around the traveling means are displayed at a position close to the speedometer. With this arrangement, it is possible to display sets of information that the driver should pay attention to in traveling together in one place. This allows the driver to check displays regarding the condition of the traveling means and surroundings around the vehicle without increase in the number of times driver's viewpoint moves. This reduces eyestrain of the driver. Further, it is possible to decrease the possibility that in traveling, the driver could miss the information that the driver should pay attention to. Still further, thanks to a small number of points to which the driver's viewpoint moves, the driver can drive with a more concentration to the front, thus contributing to a safe driving.

Further, a condition detection and display system of the present invention is such that the images showing the condition of the traveling means and the surroundings around the traveling means are graphic images containing an image of the traveling means.

According to the above arrangement, the images showing the condition of the traveling means and the surroundings around the vehicle are displayed together with the image of the traveling means, so that the driver can promptly and properly grasp the condition of the traveling means and the surroundings around the vehicle.

Still further, the condition detection and display system of the present invention may further include: direction detecting means for detecting a direction of a front end of the traveling means, wherein: on a basis of a detection result obtained by the direction detecting means, an direction of the image of the traveling means is changed. In this arrangement, the driver can properly grasp the direction of the front end of the traveling means.

Yet further, the condition detection and display system of the present invention may be such that the traveling means includes tires that transfer a drive force to a ground, and pneumatic pressure detecting means for detecting air pressure in the tires, wherein: if the air pressure in the tires is equal to or lower than a predetermined value, an image for notifying the driver of decrease in air pressure in the tires is displayed.

In this arrangement, the driver can immediately grasp an abnormal decrease in air pressure in the tires, so that it is possible to prevent troubles caused by the decrease in air pressure in the tires.

By the way, in the situation where there is an object approaching the traveling means within a predetermined distance, it is difficult for the driver to grasp the approaching object without viewing it. Further, even in the situation where the driver views the approaching object, if the driver is inattentive or the driver focuses on another object, it is difficult to promptly and securely grasp the approaching object.

In view of this, the condition detection and display system of the present invention may further include: distance detecting means for detecting a distance between the traveling mean and other object; and means for grasping a shape of the other object, wherein: if there is an object approaching the traveling means at a distance equal to or less than a predetermined value from the traveling means, an image corresponding to the shape of the object is displayed.

In this arrangement, the driver can easily grasp the object approaching the traveling means within a predetermined distance from the traveling means. For example, if there is an object approaching the traveling means within a predetermined distance from behind in the traveling direction, or if a spacing between the traveling means and an object ahead of the traveling means in the traveling direction is equal to or less than a predetermined distance, the driver can easily grasp as such. Therefore, the driver can properly handle the object approaching within a predetermined distance.

Further, the condition detection and display system of the present invention may include: relative speed detecting means for detecting a relative speed of other object relative to the traveling means; and means for grasping a shape of the other object, wherein: if there is an object approaching the traveling means at a relative speed equal to or higher than a predetermined value, an image corresponding to the shape of the object is displayed.

In this arrangement, the driver can immediately grasp the object approaching the traveling means at a relative speed equal to or above a predetermined relative speed, that is, an object rapidly approaching the traveling means in an abnormal manner. Therefore, the driver can properly handle the abnormally approaching object. For example, it is possible to immediately grasp an object rapidly approaching in an abnormal manner from behind, so that it is possible to properly handle the object approaching in an abnormal manner from behind.

Still further, the condition detection and display system of the present invention may be such that the predetermined value varies depending upon a speed of the traveling means and/or a direction where the other object is located with respect to the traveling means.

In some cases, a distance or relative speed, which requires a particular caution of the driver, between the traveling means and other object, or a distance or relative speed, which requires some action by the driver, between the traveling means and other object, differs depending upon a speed of the traveling means and a direction in which other object is located with respect to the traveling means. For example, a braking distance of the traveling means differs depending upon a speed of the traveling means, so that a spacing, which requires a particular caution of the driver, between the traveling means and other object located ahead of the traveling means in the traveling direction differs depending upon a speed of the traveling means. Therefore, it is possible to provide more appropriate information to the driver by changing the foregoing predetermined distance and predetermined relative speed, depending upon a speed of the traveling means and a direction in which other object is located with respect to the traveling means.

Yet further, the condition detection and display system of the present invention may further include: communications means for receiving ITS (Intelligent Transport Systems) information, wherein: if the received ITS information contains ITS information on surroundings around the traveling means, an image showing the surroundings around the traveling means, in accordance with the ITS information, is displayed at the position close to the speedometer.

Here, examples of the ITS information indicating the surroundings around the traveling means include information on an icy-road ahead in the traveling direction, information on side winds near the end of a tunnel, and information on existence of a stationary vehicle ahead in the traveling direction.

In this arrangement, the driver can immediately grasp information indicating the surroundings around the traveling means, contained in the received ITS information. Therefore, it is possible to promptly take a necessary action in accordance with the received ITS information.

By the way, in normal circumstances, for a safe traveling of the traveling means, the driver in the traveling means which is moving desires to grasp a situation in the traveling direction of the traveling means. On the other hand, for a safe start of the traveling means, the driver in the traveling means which is stationary or has just started moving desires to grasp the surroundings all around the traveling means.

In view of this, the condition detection and display system of the present invention may further includes: means for detecting whether the traveling means is moving, wherein: the images showing the condition of the traveling means and the surroundings around the traveling means are different depending upon a detection result obtained by the means for detecting whether the traveling means is moving.

In this arrangement, by changing the images showing the condition of the traveling means and the surroundings around the traveling means depending upon whether the traveling means is moving or the traveling means is in other state, i.e. the traveling means is stationary or has just started moving, the driver can operate in accordance with the condition.

Still further, the condition detection and display system of the present invention may further include: means for detecting a road marking, such as a white line and oblique line, marked on the road on which the traveling means, which is a vehicle, is moving, wherein: a detected road marking is displayed as the image showing the surroundings around the traveling means.

In this arrangement, an image corresponding to the detected road marking can be displayed as the image showing the surroundings around the traveling means. Therefore, from the displayed image, the driver can properly grasp a traveling speed of the traveling means, a position with respect to the road marking, and others.

Further, the condition detection and display system of the present invention may further include: means for detecting a direction of a front end of the traveling means with respect to the road marking, wherein: the images showing the condition of the traveling means and the surroundings around the traveling means contain an image of the traveling means, and a direction of the image of the traveling means is changed in accordance with the direction of the front end of the traveling means with respect to the road marking.

In this arrangement, for example, if the vehicle is changing from one lane to another, an image of the vehicle being oriented obliquely to a boundary line of the lanes, which is a road marking. Therefore, the driver can properly grasp the direction of the front end of the traveling means with respect to the road marking.

Still further, the condition detection and display system of the present invention may further include: means for detecting widths of roads around the traveling means, which is a vehicle; and means for detecting a direction of a front end of the traveling means with respect to a widest road among the roads around the traveling means, wherein: in accordance with the direction of the front end of the traveling means with respect to the widest road, a direction of the image of the traveling means is changed.

In this arrangement, the direction of the front end of the traveling means with respect to a widest road among the roads around the vehicle is detected, and in accordance with the detection result, the direction of the image of the traveling means can be changed. Therefore, the driver can properly grasp the direction of the vehicle with respect to the widest road among the roads around the vehicle, and the driver can easily start the stationary vehicle and then cause the vehicle to move to the widest road among the roads around the vehicle.

By the way, as to capturing of an image of the traveling means, it is possible to capture a partial image of the traveling means; however, it is difficult to capture a whole image of the traveling means. Therefore, the image of the traveling means is displayed using an image captured by the capturing means, only a partial image of the traveling means is displayed, so that it is difficult to grasp the condition of the traveling means and the surroundings around the traveling means.

In view of this, the images showing the condition of the traveling means and surroundings around the traveling means may be graphic images. In this arrangement, it is possible to easily display the whole image of the traveling means, and to easily grasp the condition of the traveling means and the surroundings around the traveling means.

Yet further, the graphic image may be able to be changed. In this arrangement, for example, even if the traveling means is changed in shape and color by customization and painting, a graphic image corresponding to the condition of the traveling means can be displayed.

Further, the condition detection and display system of the present invention may further include: an interface for receiving an instruction to change the graphic image. In this arrangement, through the interface, the driver can provide an instruction to change the graphic images showing the condition of the traveling means and the surroundings around the traveling means. Therefore, the driver can change the graphic images showing the condition of the traveling means and the surroundings around the traveling means, to the way the driver likes them.

Still further, the condition detection and display system of the present invention may be such that the traveling means includes an engine as driving means, and means for detecting an instruction to start the engine, wherein: the images showing the condition of the traveling means and the surroundings around the traveling means are displayed in synchronization with the instruction to start the engine.

In this arrangement, at the time of start of the traveling means, the images showing the condition of the traveling means and the surroundings around the traveling means are automatically displayed, so that the driver can see the images without manual operations.

In order to achieve the above object, a condition detection and display method of the present invention is a condition detection and display method, in traveling means that needs operation of a driver for traveling, for detecting a condition of the traveling means and surroundings around the traveling means and notifying the driver of detected condition of the traveling means and surroundings around the traveling means, wherein: images showing the condition of the traveling means and the surroundings around the traveling means are displayed at a position close to a speedometer.

According to the above method, the images showing the condition of the traveling means and the surroundings around the traveling means are displayed at the position close to the speedometer. With this arrangement, it is possible to display sets of information that the driver should pay attention to in traveling together in one place. This allows the driver to check displays regarding the condition of the traveling means and surroundings around the vehicle without increase in the number of times driver's viewpoint moves.

Note that, in the aforesaid condition detection and display system, control means for controlling the display means to display the images showing the condition of the traveling means and the surroundings around the traveling means at a position close to the speedometer can be executed on a computer by a control program for the condition detection and display system. Further, the control program for the condition detection and display system can be executed on a given computer in such a manner that the aforesaid control program for the condition detection and display system is stored in a computer-readable storage medium.

As described above, in the condition detection and display system of the present invention, the images showing the condition of the traveling means and the surroundings around the traveling means are displayed at the position close to the speedometer. With this arrangement, it is possible to display sets of information that the driver should pay attention to in traveling together in one place. This allows the driver to check displays regarding the condition of the traveling means and surroundings around the vehicle without increase in the number of times driver's viewpoint moves.

For a fuller understanding of the nature and advantages of the invention, reference should be made to the ensuing detailed description taken in conjunction with the accompanying drawings.

BEST MODE FOR CARRYING OUT THE INVENTION

One embodiment of the present invention is described below.

A condition detection and display system (present system) according to the present embodiment, which is provided in a vehicle (traveling means), detects a condition of the vehicle and surroundings around the vehicle and provides a driver of the vehicle with a detection result. Note that, in the present system, such information is displayed at a position close to a speedometer, thus allowing the driver to check the condition of the vehicle and the surroundings around the vehicle without increase in the number of times driver's viewpoint moves. This reduces eyestrain of the driver, prevents the driver from missing displayed information, allows the driver to drive with a more concentration to the front, thus contributing to a safe driving.

Figure 1:
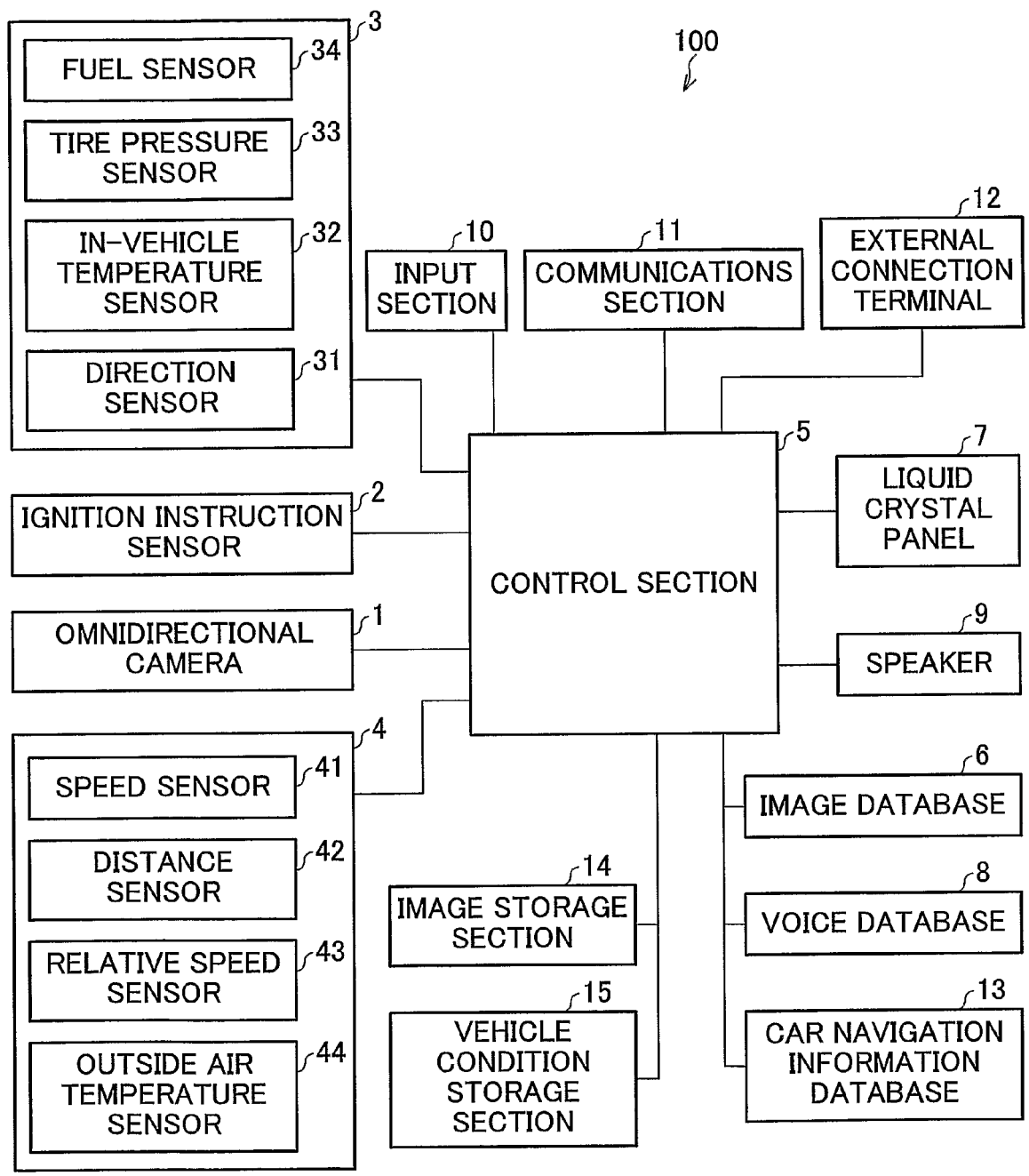
FIG. 1 is a block diagram schematically illustrating a configuration of a condition detection and display system according to one embodiment of the present invention.

FIG. 1 is a block diagram schematically illustrating a configuration of the present system. As illustrated in FIG. 1, the present system 100 is composed of: an omnidirectional camera (capturing means, distance detecting means, relative speed detecting means) 1, an ignition instruction sensor 2, internal condition sensors 3, external condition sensors 4, a control section (distance detecting means, relative speed detecting means, control means) 5, an image database 6, a liquid crystal panel (display means) 7, an voice database 8, a speaker (voice output means) 9, an input section 10, a communications section (communications means) 11, an external connection terminal 12, a car navigation information database 13, an image storage section 14, and a vehicle condition storage section 15.

The omnidirectional camera 1 is mounted on a roof of a vehicle and captures images of the surroundings around the vehicle in all directions (360° about an axis that is a direction substantially vertical to the ground surface). In the present system 100, what is used as the omnidirectional camera 1 is one capable of capturing images in all directions at once. That is, the omnidirectional camera 1 is composed of (i) a camera that is provided in such a manner that a capturing direction is a direction substantially vertical to the ground surface and (ii) a conical reflector provided on a capturing axis, and the omnidirectional camera 1 captures all-direction images reflected on the reflector, thereby being capable of capturing images in all directions at once.

The ignition instruction sensor 2 detects that the driver gives an engine starting instruction by inserting and turning an ignition key.

The internal condition sensors 3 include a direction sensor (direction detecting means) 31, an in-vehicle temperature sensor 32, a tire pressure sensor (pneumatic pressure detecting means) 33, a fuel sensor 34, and others. The direction sensor 31 detects a direction of the front end of the vehicle. The in-vehicle temperature sensor 32 detects a temperature in the vehicle. The tire pressure sensor 33 detects of pressures of the tires. The fuel sensor 34 detects a remaining amount of fuel.

The external condition sensors 4 include a speed sensor 41, a distance sensor (object sensor) (distance detecting means) 42, a relative speed sensor (relative speed detecting means) 43, an outside air temperature sensor 44, and others. The speed sensor 41 detects a speed of the vehicle. The distance sensor 42 detects a distance between the vehicle and other object and widths of roads around the vehicle. The relative speed sensor 43 detects a relative speed of other object relative to the vehicle. The outside air temperature sensor 44 detects a temperature outside of the vehicle.

Although not illustrated in FIG. 1, the external condition sensors 4 include a vehicle position sensor that detects a position of the vehicle by using a GPS (Global Positioning Systems), positional information of a base station provided in a mobile telephone system, and others. This vehicle position sensor, the speed sensor 41, the direction sensor 31, and the like are used in a car navigation system.

The control section 5 is a center part of the present system 100 and controls all the operations of the present system 100. That is, the control section 5 controls the members provided in the present system 100 and causes them to detect the internal condition of the vehicle and the surroundings around the vehicle, and provides the driver with necessary information. Note that, the functions of the control section 5 are realized in such a manner that a CPU (Central Processing Unit) executes a program stored in a storage device such as RAM or flash memory.

The image database 6 stores, in the form of bitmap data, a graphic image of the vehicle, and graphic images of various conditions that potentially occur in the vehicle and surroundings around the vehicle. That is, the image database 6 stores a graphic image of the vehicle, and graphic images of conditions that can possibly occur in the vehicle and surroundings around the vehicle, graphic images on road surfaces information, and other graphic images. The control section 5 selects, in accordance with information to be displayed, selects the corresponding image information from among image information stored in the image database 6, and causes the liquid crystal panel 7 to display the selected image information thereon.

On the liquid crystal panel 7, instruments such as a speedometer, a tachometer, and a fuel gauge are displayed, and information on the vehicle and surroundings around the vehicle is displayed at a position close to the speedometer. In addition, on the liquid crystal panel 7, images captured by the omnidirectional camera 1, in-vehicle temperature, operational status of an air conditioner, car navigation information, television program, reception frequency of a radio program, Internet-based information, and other information can be displayed. Note that, the liquid crystal panel 7 in the present system 100 is provided with a super wide screen having an aspect ratio (width-to-height ratio of a display area) of 7:3 or greater.

The voice database 8 stores voice output data. In the present system 100, for example, the occurrence of changes in the surroundings around the vehicle can be displayed on the liquid crystal panel 7 and can be notified by voice to the driver. That is, the control section 5 selects, in accordance with information to be notified to the driver, the corresponding information from among voice data stored in the voice database 8 and causes the speaker 9 to output the selected voice data.

The input section 10 receives an instruction given from the driver to the present system 100 and transfers the instruction to the control section 5. Note that, in the present system 100, a touch panel provided on the liquid crystal panel 7 is used as the input section 10. In other words, in the present system 100, items that can be entered by the driver are displayed on the liquid crystal panel 7, and the driver can give an instruction to the present system 100 with a touch of a display area where the item that the driver wants is displayed.

The communications section 11 receives television programs, radio programs, and ITS information. Though the communication section 11, the present system 100 can be connected to Internet or the like.

The image storage section 14 stores image data captured by the omnidirectional camera 1.

The vehicle condition storage section 15 stores information on a condition of the vehicle, for example, including a traveled distance, a date of a previous engine oil change, and a traveled distance at the time of the previous engine oil change.

The car navigation information database 13 stores car navigation information including geographical information and various shop information.

The external connection terminal 12 is an interface for connection of the present system 100 to other device. Note that, the present system 100 is arranged such that other device such as a personal computer or external memory is connected to the external connection terminal 12 so that information stored in the image database 6, the voice database 8, the car navigation information database 13, and others can be updated.

Figure 2:
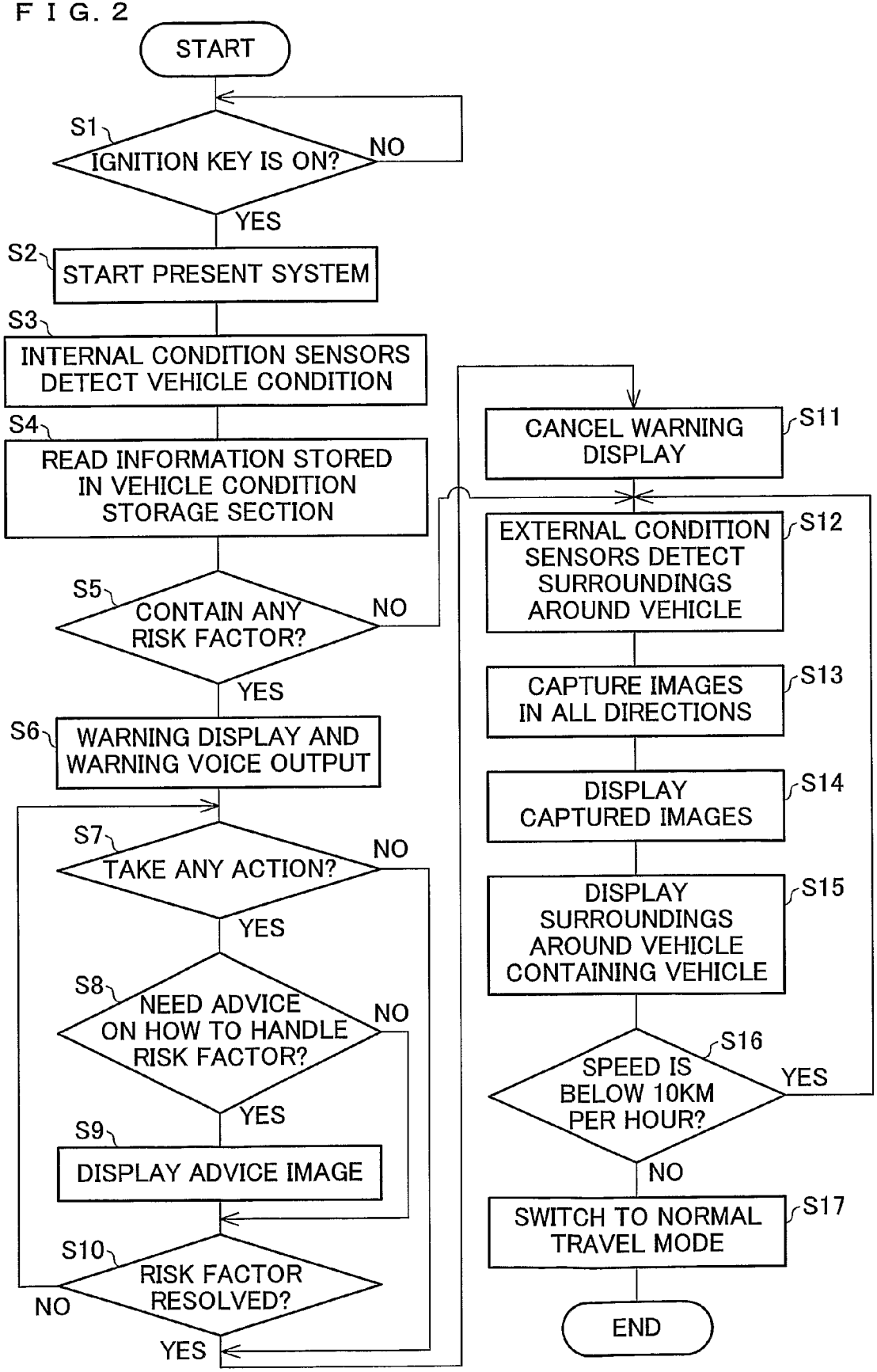
FIG. 2 is a flowchart illustrating a process flow of start of a parked or stationary vehicle in the condition detection and display system according to one embodiment of the present invention.

Here, a process flow in the present system 100 is described. First of all, a process flow of start of a parked or stationary vehicle (start mode) is described. FIG. 2 is a flowchart illustrating a process flow of start of the parked or stationary vehicle (start mode) in the present system 100.

As illustrated in FIG. 2, when the vehicle is parked or stationary with its engine being not started, the control section 5 causes the ignition instruction sensor 2 to monitor a turn-on of the ignition key (S1).

Then, when the ignition instruction sensor 2 detects that the ignition key has been turned on, the control section 5 starts the present system 100 (S2). That is, power to the present system 100 is turned on. Note that, power to the present system 100 is supplied from a battery for engine start provided in the vehicle.

Next, the control section 5 causes the internal condition sensors 3 to detect the condition of the vehicle (S3). That is, the direction sensor 31 detects a direction of the front end of the vehicle, and the in-vehicle temperature sensor 32 detects a temperature in the vehicle, the tire pressure sensor 33 detects pressure of the tires, and the fuel sensor 34 detects a remaining amount of fuel. Further, the control section 5 reads information stored in the vehicle condition storage section 15 (S4).

Next, the control section 5 determines whether results of the detections in S3 and a result of reading in S4 contain factors that could cause troubles in traveling and factors that require maintenance (hereinafter referred to as risk factors) (S5). For example, the control section 5 regards an abnormal reduction in tire pressure and a fuel remaining less than a predetermined amount as being the factors that could cause troubles in traveling. Further, for example, the control section 5 regards, as being the factors that require maintenance, a lapse of a given period after a previous change of the engine oil or a reach to a given distance traveled after a previous change of the engine oil.

If they contain no risk factor, Step S12 and the following steps are performed. On the other hand, if they contain any risk factor, the control section 5 causes to provide a warning display and a warning voice output (S6). That is, the control section 5, if there is any risk factor, selects an image corresponding to the risk factor from among image data stored in the image database 6 and displays the selected image on the liquid crystal panel 7, and the control section 5 selects a voice for notification of the risk factor from among voice data stored in the voice database 8 and then outputs the selected voice from the speaker 9. Note that, the aforesaid image corresponding to the risk factor is a graphic image containing an image of the vehicle. Seeing this image, the driver can promptly and properly grasp what the risk factor is and a place where the risk factor exists. Moreover, this image is displayed at a position close to the speedometer.

Next, the control section 5 waits for a driver's instruction whether to take any action with respect to the detected risk factor (S7). That is, the control section 5 causes the liquid crystal panel 7 to display a message that asks the driver about whether any action will be taken to resolve the detected risk factor, and then waits for the driver's instruction. At the time, the driver can enter a response on whether any action will be taken, through the input section 10. Note that, in the present system 100, if there is no entry from the driver after a lapse of a predetermined period of time, the subsequent steps are carried out without taking any action to the risk factor.

If it is selected in S7 that no action will be taken, the process goes to Step S11. On the other hand, if it is selected in S7 that any action will be taken, the control section 5 causes the liquid crystal panel 7 to display a message that asks the driver about whether the driver needs advice on how to handle the risk factor (S8). Note that, the driver can enter, through the input section 10, a response on whether the driver needs advice on how to handle the risk factor.

Here, if the driver enters that advice on how to handle the risk factor is needed, the control section 5 selects, from the image database 6, an animation image for advising the driver about how to handle corresponding to the detected risk factor and causes the liquid crystal panel 7 to display the selected animation image. That is, the image database 6 stores in advance animation images for advising how to handle corresponding to risk factors. For example, in the event of abnormal reduction in air pressure in the tire, animation images of how to set a warning triangle, a place where a spare tire and tools for tire change are stored, how to use the tools, steps for changing the tire, and other instructions are displayed on the liquid crystal panel 7. Note that, among these sets of information, only the information that the driver needs may be selected by the driver and then displayed on the liquid crystal panel 7. Further, the driver can switch information to be displayed one by one, in accordance with a progress of the corresponding steps for handling the risk factor.

Further, the control section 5 monitors whether the risk factor has been resolved (S10). If the risk factor persists, Step S7 and the following steps are repeated. That is, the present system 100 accepts the driver's instructions regarding Steps S7 and S8 at any time until the risk factor is resolved.

On the other hand, if the risk factor has been resolved in Step S10, or if it is selected that no action will be taken in Step S7, the control section 5 cancels the display regarding the risk factor (S11).

Next, the control section 5 causes the external condition sensors 4 to detect surroundings around the vehicle (S12).

That is, the distance sensor 42 detects a distance between the vehicle and other object and widths of roads around the vehicle. The relative speed sensor 43 detects a relative speed of a moving object (e.g. pedestrian, bicycle, or automobile) around the vehicle, relative to the vehicle. The outside air temperature sensor 44 detects a temperature outside of the vehicle.

Further, the control section 5 controls the omnidirectional camera 1 and causes it to capture images in all directions around the vehicle (S13). Then, the control section 5 successively transfers the captured images to the liquid crystal panel 7 and causes the liquid crystal panel 7 to display them (S14). Note that, the images captured by the omnidirectional camera 1 are displayed on the liquid crystal panel 7 in an area that is different from the area where the speedometer is displayed. Moreover, in the present system 100, as to the images captured by the omnidirectional camera 1, images captured at predetermined angles around the vehicle are displayed on the liquid crystal panel 7, and the surroundings around the vehicle can be checked with 360-degree rotation of the omnidirectional camera 1 about the vehicle in such a manner that an angle of the image to be displayed (angle of a capturing direction) is successively changed. This allows the driver to easily check the images in all directions and the capturing directions of the images.

Further, the control section 5 grasps the surroundings around the vehicle from the detection result, which has been obtained in Step S12, and the images in all directions, which have been captured in Step S13, and causes the liquid crystal panel 7 to display them, as information on the vehicle and the surroundings around the vehicle, at a position close to the speedometer (S15).

More specifically, the control section 5 grasps the presence and absence of rainfall and snowfall, from capturing results obtained by the omnidirectional camera 1. For example, in the event of a rainfall, the control section 5 selects an image showing rainfall, as an image showing the information on the vehicle and surroundings around the vehicle, from the image database 6, and then causes the liquid crystal panel 7 to display the selected image. In the event of a snowfall, the control section 5 selects an image showing snowfall, and then causes the liquid crystal panel 7 to display the selected image. Further, on the basis of the detection result obtained by the distance sensor 42, the control section 5 determines widths of roads around the vehicle and the widest road (main road) among the roads around the vehicle, so as to change the direction of the displayed graphic image of the vehicle in accordance with the direction of the vehicle with respect to the main road. Further, on the basis of the capturing results obtained by the omnidirectional camera 1 and the detection result obtained by the distance sensor 42, the control section 5 grasps an obstacle around the vehicle, selects an image corresponding to the obstacle from the image database 6, and causes the liquid crystal panel 7 to display the selected image in the form of a graphic image including the image of the vehicle. Still further, on the basis of the capturing result obtained by the omnidirectional camera 1 and the detection result obtained by the relative speed sensor 43, the control section 5 grasps a shape of a moving object around the vehicle, selects an image corresponding to the moving object from the image database 6, and causes the liquid crystal panel 7 to display the selected image in the form of a graphic image including the image of the vehicle.

Yet further, the control section 5 causes the speed sensor 41 to monitor the speed of the vehicle (S16). If the speed of the vehicle is below 10 km per hour, the control section 5 judges that a start operation has not been yet completed by the driver, and repeats Step S12 and the following steps. That is, the control section 5 causes the external condition sensors 4 to continue the detection of a condition outside the vehicle, causes the omnidirectional camera 1 to continue capturing images in all directions, causes the liquid crystal panel 7 to successively display the captured image data, and successively updates graphic images showing the condition of the vehicle and surroundings around the vehicle in accordance with the detected condition outside the vehicle and the capturing results.

On the other hand, in Step S16, if the speed of the vehicle is 10 km per hour or above, the control section 5 judges that the start operation by the driver has been completed, switches to a normal travel mode, and finishes the steps of the start mode.

Note that, in the present system 100, if the ignition key is turned off during the implementation of the steps for the start mode, power to the present system 100 is turned off so that all the steps are ceased.

According to the descriptions of the present system 100, in Step S7, if there is no entry from the driver after a lapse of a predetermined period of time, the subsequent steps are carried out without taking any action to the risk factor. However, the present invention is not limited to this arrangement. For example, the present invention may be arranged such that the risk factors are classified according to their types into importance levels and how to handle the risk factor if there is no entry from the driver is set for each importance level. For example, it can be considered that the risk factors are classified into: factors that must be handled as soon as possible (Importance level A); factors that are preferably to be handled as soon as possible (Importance level B); and factors that are preferably to be handled in the near future (Importance level C). In this arrangement, for example, as to the risk factor in the importance level A, if there is no entry from the driver, Step S8 and the following steps may be carried out. As to the risk factors in the importance levels B and C, if there is no entry from the driver, the subsequent steps may be carried out without taking any action to the risk factors.

Further, according to the descriptions of the present system 100, if the speed of the vehicle reaches 10 km per hour or more, the control section 5 judges that the start operation by the driver has been completed, and switches to the normal travel mode. However, a timing to switch to the normal travel mode is not limited to this. For example, the present invention may be arranged such that if the speed of the vehicle reaches other speed (e.g. 8 km or 12 km per hour), a switch to the normal travel mode is carried out. In an alternative example, in the arrangement in which a sensor for detecting release of a parking brake is provided, the present invention may be arranged such that if the parking brake is released, the switch to the normal travel mode is carried out. In another alternative example, in the arrangement in which a sensor for detecting the position of a gearshift lever is provided, the present invention may be arranged such that if the gearshift lever is put into drive, the switch to the normal travel mode is carried out. In yet another example, the prevent invention may be arranged such that the switch to the normal travel mode is carried out in accordance with an instruction from the driver.

Figure 3:
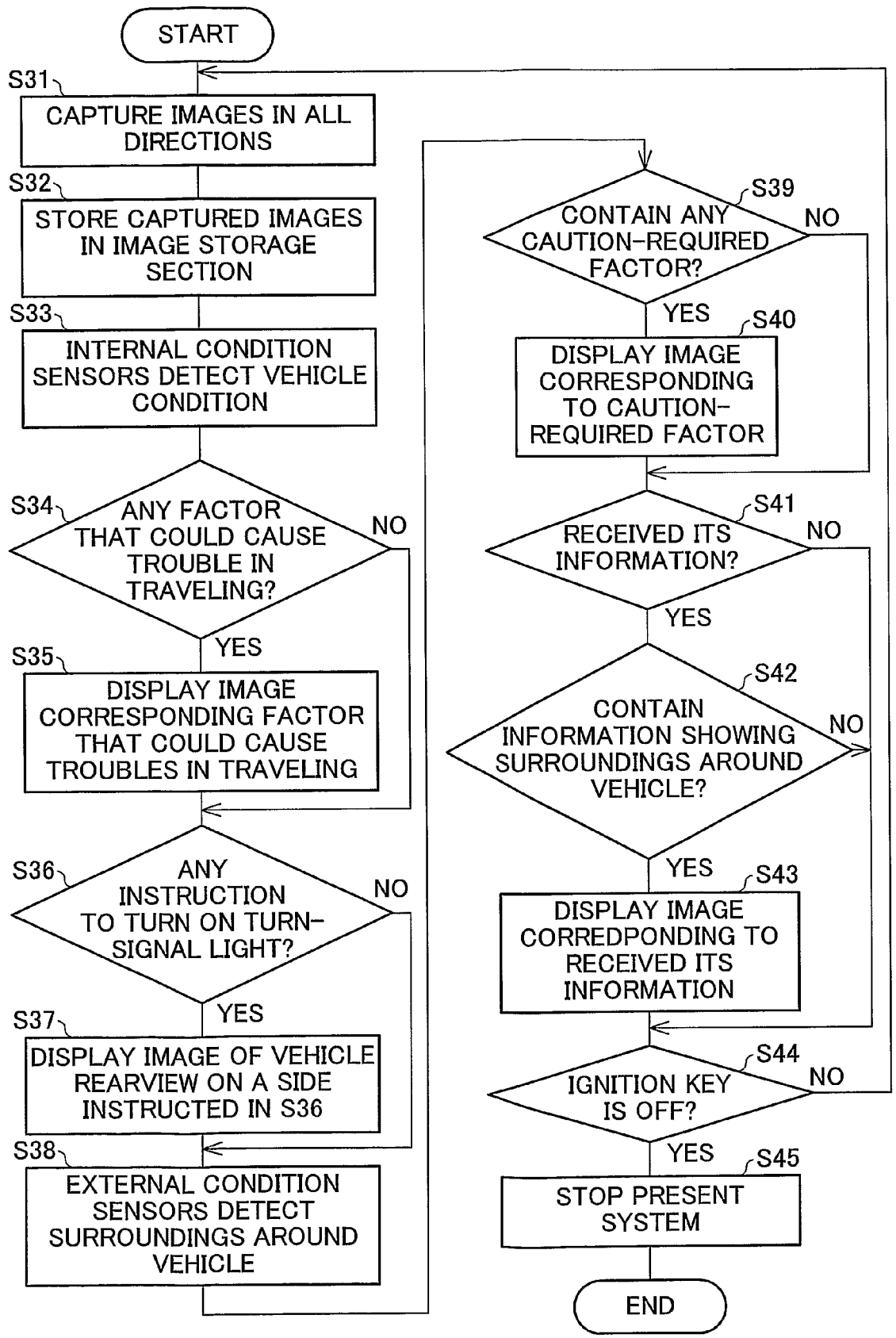
FIG. 3 is a flowchart illustrating a process flow of a normal travel in the condition detection and display system according to one embodiment of the present invention.

Next, the following will describe a process flow in a normal travel (normal travel mode). FIG. 3 is a flowchart illustrating a process flow of a normal travel in the present system 100.

The control section 5 causes the omnidirectional camera 1 to capture images in all directions about the vehicle (S31). Further, the control section 5 causes the image storage section to successively store the images captured by the omnidirectional camera 1 (S32). That is, 360° view images of the surroundings around the vehicle in traveling are recorded all the time. For example, this allows the driver to view landscapes that have been missed during the driving in the later time. The recording information can be associated with positional information in the car navigation system to create a video clip of a driving route. The video clip created in such a manner is associated with the positional information in the car navigation system, so that the video clip can be used for a guide in the car navigation. For example, from a previously displayed image of a target intersection at which the vehicle will turn left or right, the driver can easily and surely grasp where the target intersection is. This makes it possible to prevent the driver from making a mistake such as missing of the target intersection and turning at an intersection provided before the target intersection.

Further, the control section 5 causes the internal condition sensors 3 to detect the condition of the vehicle (S33). Then, the control section 5 determines whether the detection result obtained by the internal condition sensors 3 contains any factor that could cause troubles in traveling (S34). For example, the control section 5 judges an abnormal reduction in tire pressure and a fuel remaining less than a predetermined amount as being the factors that could cause troubles in traveling.

If the detection result obtained by the internal condition sensors 3 contains no factor that could cause troubles in traveling, Step S36 and the following steps are carried out. If the detection result obtained by the internal condition sensors 3 contains a factor that could cause troubles in traveling, the control section 5 selects, from the image database 6, a graphic image, containing the image of the vehicle, for notifying the driver of a content of the factor and a place where the factor has been found, and causes the liquid crystal panel 7 to display the selected image thereon at a position close to the speedometer (S35). Note that, this display is cancelled if the factor that could cause troubles in traveling is resolved, or if an instruction to cancel this display is provided from the driver. The driver can causes advice on how to handle the factor that could cause troubles in traveling to show up on the liquid crystal panel 7. That is, the control section 5, if the driver has requested for advice on how to handle the factor, selects an animation image for advising how to handle the factor from the image database 6, and causes the liquid crystal panel 7 to display the selected animation image thereon. Note that, in the case when displaying such an image during driving of the vehicle poses a danger, it may be arranged such that the image can be displayed only after the vehicle is stopped, for example.

Figure 4:
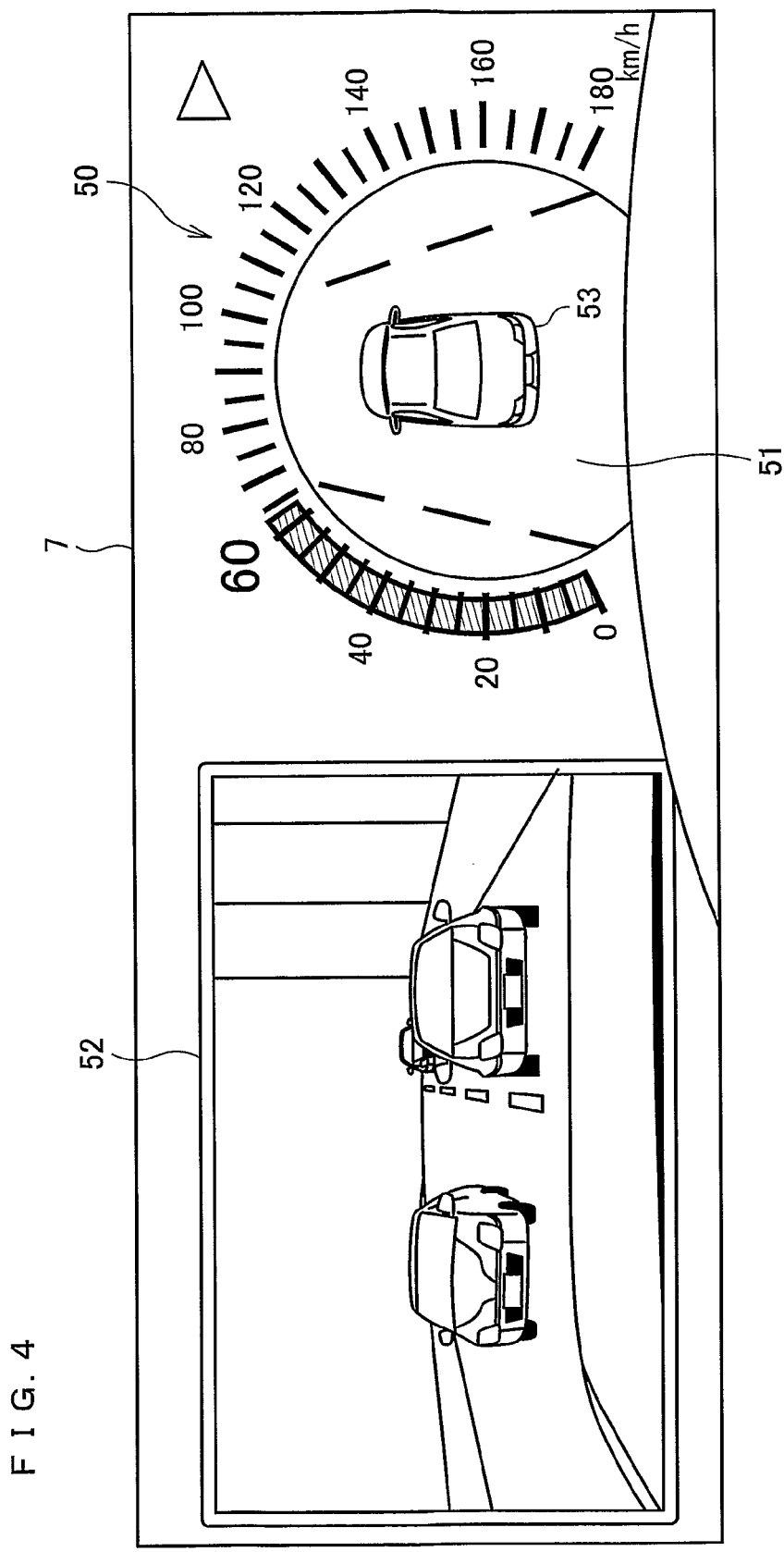
FIG. 4 is an explanatory view illustrating an example of a displayed state when a turn-signal light is turned on in the condition detection and display system according to one embodiment of the present invention.

Further, the control section 5 monitors an instruction to turn on a turn-signal light, i.e. an instruction such as left turn, right turn, and lane change, from the driver (S36). If no instruction to turn on the turn-signal light is given from the driver, Step S38 and the following steps are carried out. On the other hand, if the instruction to turn on the turn-signal light is given from the driver, the control section 5 causes the liquid crystal panel 7 to display a rear view image, which has been captured by the omnidirectional camera 1, on the left side or right side instructed by the driver to turn on the turn-signal light. This image is displayed on the liquid crystal panel 7 in an area that is different from the area of the speedometer (S37). FIG. 4 is an explanatory view illustrating an example of a displayed state of the liquid crystal panel 7 when the driver instructs to turn on the turn-signal light to the right. As illustrated in FIG. 4, images 52 showing a rear view and right rear view of the vehicle, captured by the omnidirectional camera 1, are displayed on the liquid crystal panel 7 at the position that is different from that of the speedometer 50. On the liquid crystal panel 7, at the position close to a speedometer 50, graphic images 51 containing the image of the vehicle are displayed.

Then, the control section 5 causes the external condition sensors 4 to detect the surroundings around the vehicle (S38). Subsequently, the control section 5 determines whether detection results obtained by the external condition sensors 4 contain a caution-required factor (S39). Then, if the detection results obtained by the external condition sensors 4 contain no caution-required factor, Step S41 and the following steps are carried out. On the other hand, if the detection results obtained by the external condition sensors 4 contains the caution-required factor, the control section 5 selects from the image database 6 a graphic image, containing the image of the vehicle, for notifying the driver of that factor, and causes the liquid crystal panel 7 to display the selected graphic image at the position close to the speedometer (S40).

Figure 5:
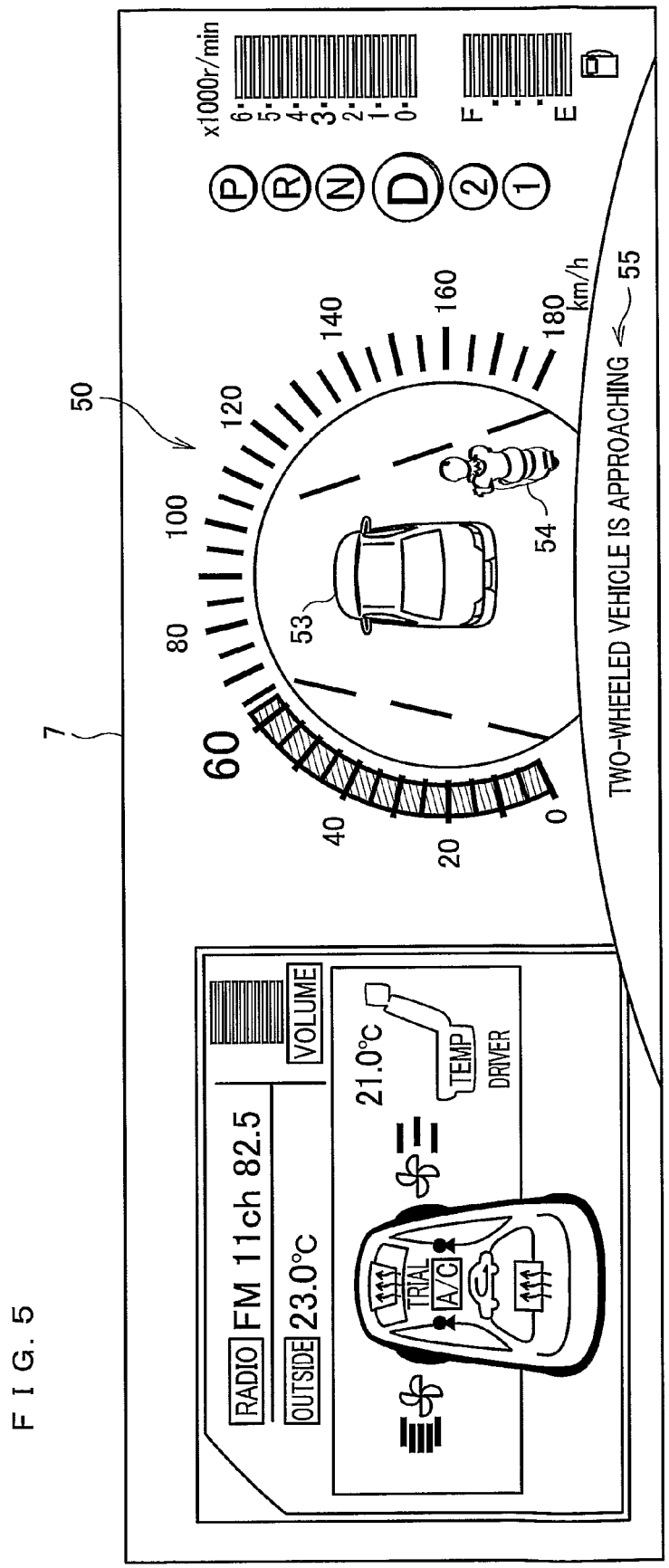
FIG. 5 is an explanatory view illustrating an example of a displayed state when a two-wheeled vehicle approaches a vehicle from behind on the right of the vehicle in the condition detection and display system according to one embodiment of the present invention.

For example, if a distance between the vehicle and other object located in a rearward position, detected by the distance sensor 42, is within a predetermined distance, the control section 5 judges it as the caution-required factor. In this case, from a capturing result obtained by the omnidirectional camera 1, the control section 5 grasps the shape of an object approaching the vehicle within a predetermined distance, selects from the image database 6 a graphic image, containing the image of the vehicle, corresponding to the grasped shape of the object and the position of the object with respect to the vehicle, and causes the liquid crystal panel 7 to display the selected graphic image at the position close to the speedometer. FIG. 5 is an explanatory view illustrating an example of a displayed state when a two-wheeled vehicle approaches the vehicle from behind on the right of the vehicle within a predetermined distance. As illustrated in FIG. 5, a graphic image 54 of the two-wheeled vehicle is displayed behind on the right of a graphic image 53 of the vehicle, and character information 55 for notifying the driver of the approaching two-wheeled vehicle is displayed. Note that, if there is the caution-required factor, the control section 5 may select voice data corresponding to the caution-required factor from the voice database 8 and cause the speaker 9 to output the selected voice data, in addition to the display on the liquid crystal panel 7.

According to the above descriptions, if the distance between the vehicle and other object located in a rearward position, detected by the distance sensor 42, is within a predetermined distance, the control section 5 judges it as the caution-required factor. However, the present invention is not limited to this arrangement. For example, the present invention may be arranged such that if a relative speed of other object located behind the vehicle, detected by the relative speed sensor 43, is a predetermined relative speed or higher with respect to the vehicle, the control section 5 judges it as the caution-required factor. That is, the present invention may be arranged such that if an object rapidly approaches the vehicle in an abnormal manner, the control section 5 grasps, from a capturing result obtained by the omnidirectional camera 1, the shape of the object approaching in an abnormal manner, selects from the image database 6 a graphic image, containing the image of the vehicle, corresponding to the grasped shape of the object and the position of the object with respect to the vehicle, and causes the liquid crystal panel 7 to display the selected graphic image at the position close to the speedometer. Alternatively, the present invention may be arranged such that if a distance between the vehicle and other object located behind the vehicle is within a predetermined distance, and a relative speed of the aforesaid other object, detected by the relative speed sensor 43, is a predetermined relative speed or higher with respect to the vehicle, the control section 5 judges it as the caution-required factor.

Figure 6:
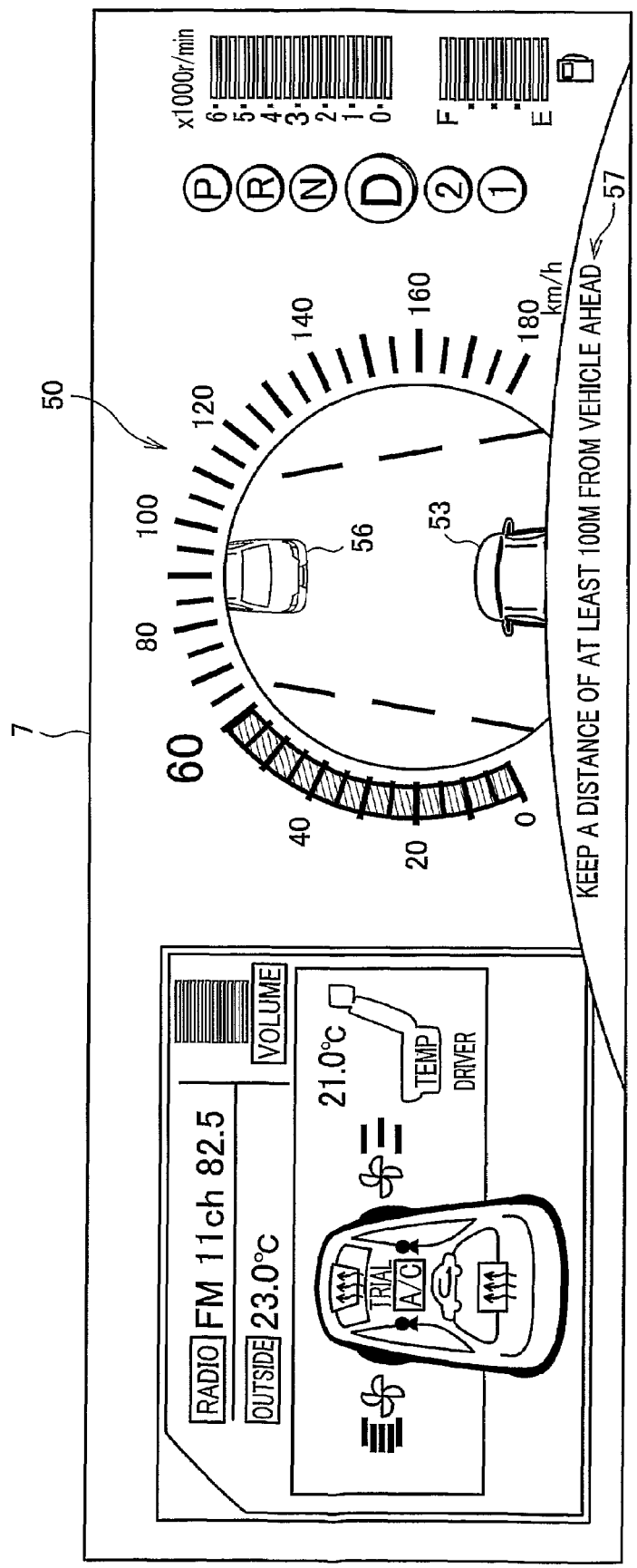
FIG. 6 is an explanatory view illustrating an example of a displayed state when a distance between the vehicle and another vehicle driving ahead of the vehicle lacks in the condition detection and display system according to one embodiment of the present invention.

Further, for example, if a distance between the vehicle and another vehicle driving ahead of the vehicle is within a predetermined distance, i.e. if a distance between the vehicle and another vehicle driving ahead of the vehicle is too close, the control section 5 judges it as the caution-required factor. FIG. 6 is an explanatory view illustrating an example of a displayed state on the liquid crystal panel 7 when a distance between the vehicle and another vehicle driving ahead of the vehicle is within a predetermined distance. As illustrated in FIG. 6, on the liquid crystal panel 7, a graphic image 56 of an automobile is displayed in front of the graphic image 53 of the vehicle, and character information 57 is displayed for notifying the driver of a too close distance between the vehicle and another vehicle ahead of the vehicle.

Still further, the foregoing predetermined distance and predetermined relative speed for judgment as to whether it is the caution-required factor, may be changed depending upon a speed of the vehicle and a position of other object in a traveling direction of the vehicle. In some cases, a distance or relative speed, which requires a particular caution of the driver, between the vehicle and other object, or a distance or relative speed, which requires some action by the driver, between the vehicle and other object, differs depending upon a speed of the vehicle and a direction in which other object is located with respect to the vehicle. For example, a braking distance of the vehicle differs depending upon a speed of the vehicle, so that a spacing, which requires a particular caution of the driver, between the vehicle and other object located ahead of the vehicle in the traveling direction differs depending upon a speed of the vehicle. Therefore, it is possible to provide more appropriate information to the driver by changing the foregoing predetermined distance and predetermined relative speed for judgment as to whether it is the caution-required factor, depending upon a speed of the vehicle and a direction in which other object is located with respect to the vehicle. Note that, in this case, the present invention may be arranged so as to be provided with means for storing a list (table) that records the foregoing predetermined distance and predetermined relative speed for judgment as to whether it is the caution-required factor, the foregoing predetermined distance and predetermined relative speed being determined in advance depending upon a speed of the vehicle and a position of other object with respect to the vehicle.

The present system 100, as described above, is arranged so as to receive the ITS information through the communications section 11. The control section 5 monitors a reception of the ITS information through the communications section 11 (S41). If the ITS information has not been received, the control section 5 performs Step S44 and the following steps. On the other hand, if the ITS information has been received, the control section 5 determines whether the received ITS information contains information showing surroundings around the vehicle (hereinafter referred to as warning information) (S42).

If the received ITS information contains no warning information, the control section 5 performs Step S44. On the other hand, if the received ITS information contains the warning information, the control section 5 selects from the image database 6 a graphic image corresponding to that warning information and causes the liquid crystal panel 7 to display the selected graphic image at the position close to the speedometer (S43).

Figure 7:
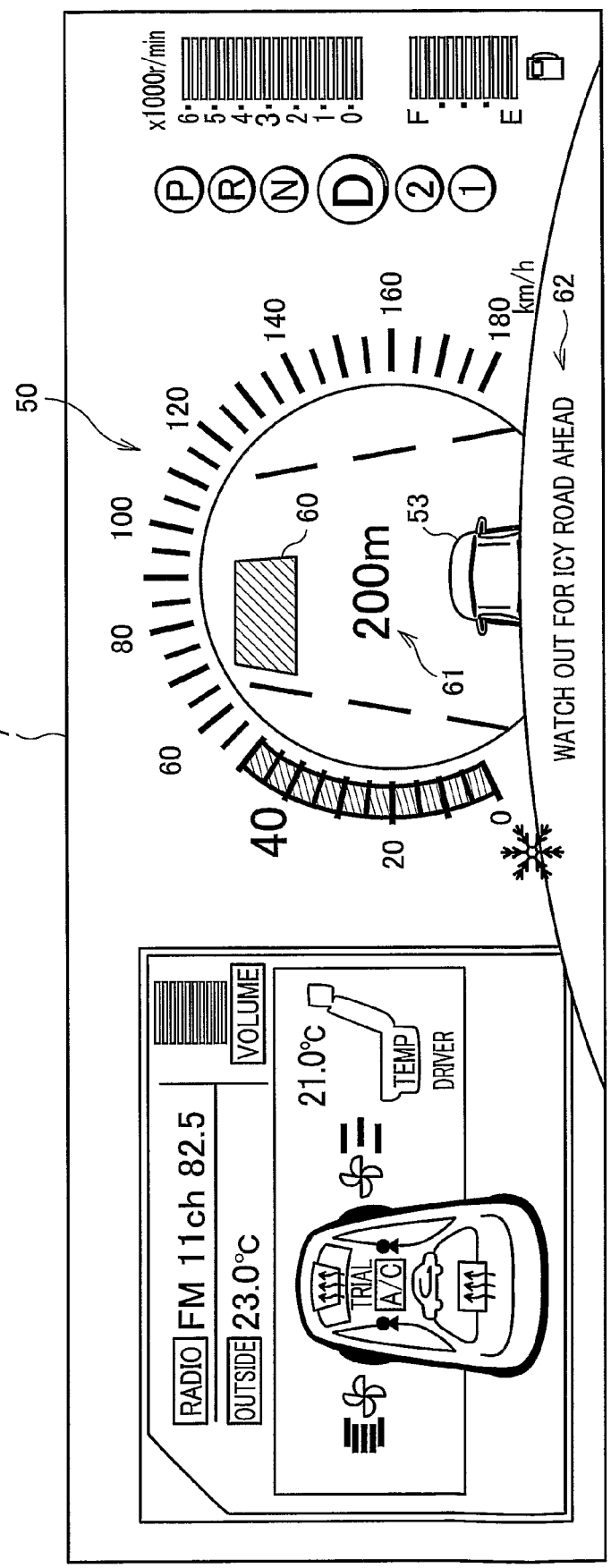
FIG. 7 is an explanatory view illustrating an example of a displayed state when information on an icy-road has been received in the condition detection and display system according to one embodiment of the present invention.
Figure 8:
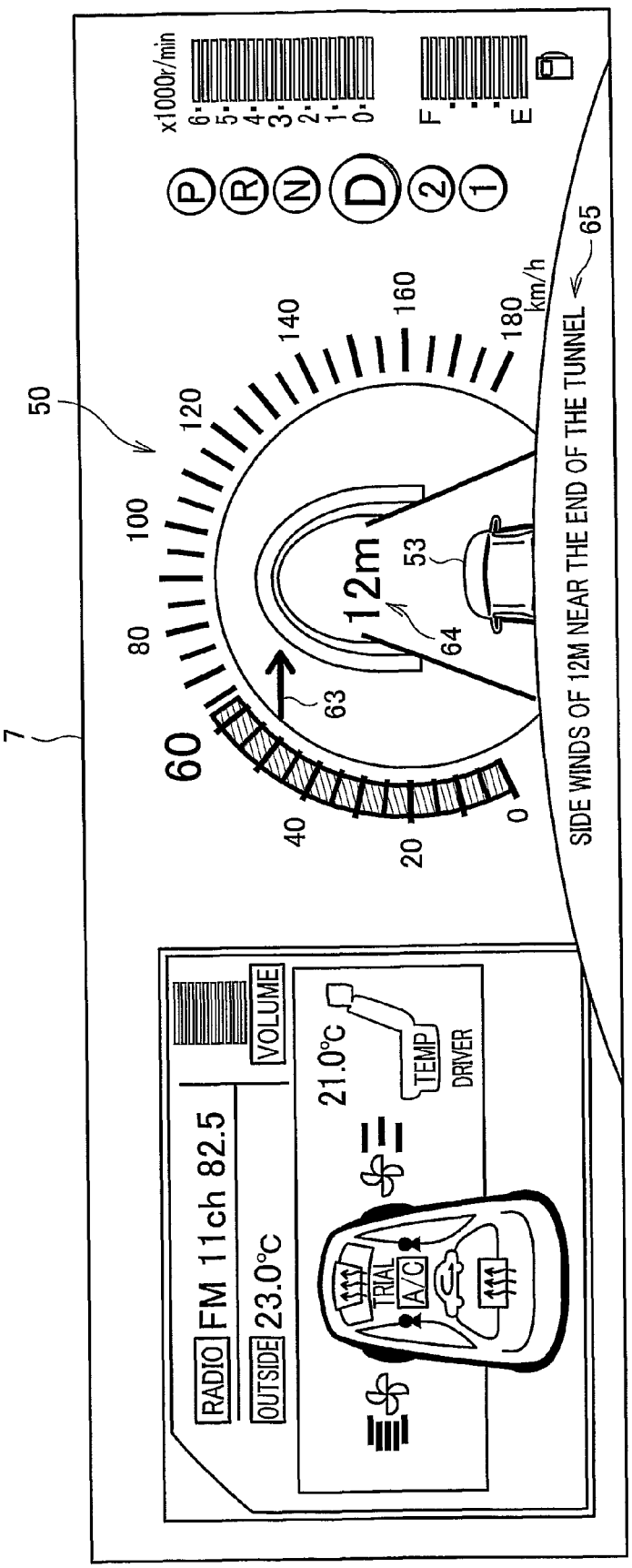
FIG. 8 is an explanatory view illustrating an example of a displayed state when the information on side winds near the end of the tunnel has been received in the condition detection and display system according to one embodiment of the present invention.

Note that, examples of the warning information contained in the ITS information includes information on an icy road ahead in the traveling direction, information on side winds near the end of a tunnel, and information on existence of a stationary vehicle ahead in the traveling direction. FIG. 7 is an explanatory view illustrating an example of a displayed state on the liquid crystal panel 7 when the information on an icy road has been received. As illustrated in FIG. 7, on the liquid crystal panel 7, a graphic image 60 showing an icy road and a distance 61 to the position of the icy road are displayed in front of the graphic image 53 of the vehicle, and character information 62 for alerting the driver to the icy road is displayed. FIG. 8 is an explanatory view illustrating an example of a displayed state on the liquid crystal panel 7 when the information on side winds near the end of the tunnel has been received. As illustrated in FIG. 8, on the liquid crystal panel 7, graphic images of the tunnel, an arrow 63 showing a direction of the side winds near the end of the tunnel, and characters 64 representing a wind speed, are displayed in front of the graphic image 53 of the vehicle. Also, characters 65 for alerting the driver to the side winds near the exit of the tunnel are displayed.

Further, the control section 5 causes the ignition instruction sensor 2 to monitor a turn-off of the ignition key (S44). If the ignition key has not been turned off, Steps S31 through S44 are continued. On the other hand, if the ignition key has been turned off, the control section 5 causes the present system 100 to stop (S45), i.e. turns off power to the present system 100 to finish the process in the present system 100.

As described above, in the present system 100, the condition of the vehicle and the surroundings around the vehicle are detected, and an image corresponding to the detected information is displayed on the liquid crystal panel 7 at the position close to the speedometer. With this arrangement, it is possible to display sets of information that the driver should pay attention to in traveling together in one place. Therefore, it is possible to display the sets of information that the driver should pay attention to in traveling, without increasing the number of points to which the driver's viewpoint moves in traveling. This reduces eyestrain of the driver. Further, it is possible to decrease the possibility that in traveling, the driver could miss the information that the driver should pay attention to. Still further, thanks to a small number of points to which the driver's viewpoint moves, the driver can drive with a more concentration to the front, thus contributing to a safe driving.

Note that, in FIGS. 4 through 8, the round speedometer 50 is provided, and the speedometer 50 includes the graphic images 51 showing the condition of the vehicle and the surroundings around the vehicle in the center of the speedometer 50. However, the present invention is not limited to this arrangement. Alternatively, the graphic images 51 may be displayed at the position close to the speedometer 50.

Figure 9:
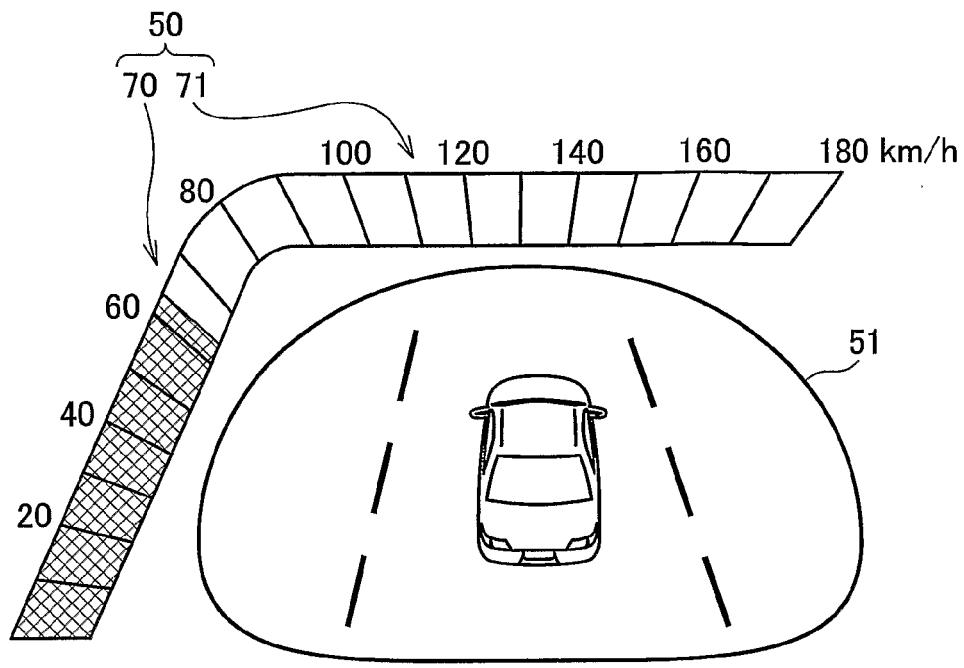
FIG. 9 is an explanatory view illustrating an example of a display manner of images showing a speedometer, a vehicle, and surroundings around the vehicle in the condition detection and display system according to one embodiment of the present invention.

For example, as illustrated in FIG. 9, in the arrangement in which the speedometer 50 is realized by a gauge having a slope section 70 that extends in the upper right direction and a horizontal section 71 that extends from a right edge (top) of the slope section 70 to the right, the graphic images 51 showing the condition of the vehicle and surroundings around the vehicle may be displayed at a position, close to the speedometer 50, on the right side of the slope section 70 below the horizontal section 71. In other words, the gauge of the speedometer 50 may be displayed on the left and upper sides of the graphic images 51.

Figure 10:
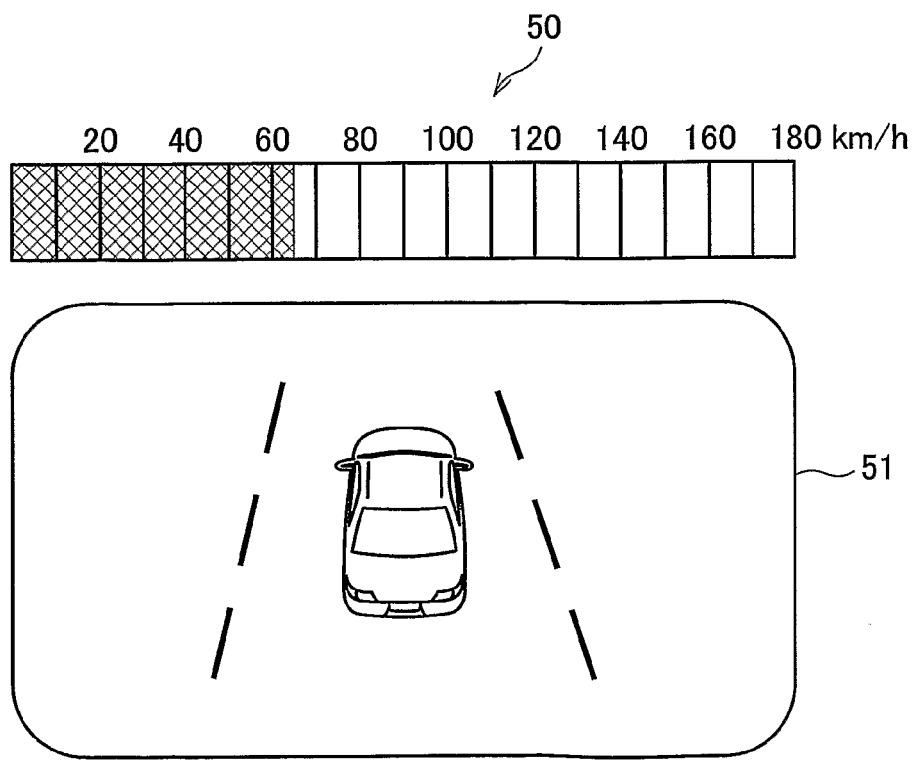
FIG. 10 is an explanatory view illustrating another example of a display manner of images showing a speedometer, a vehicle, and surroundings around the vehicle in the condition detection and display system according to one embodiment of the present invention.

Further, for example, as illustrated in FIG. 10, in the arrangement in which the speedometer 50 is realized by a bar gauge extending in the left and right direction, the graphic images 51 showing the condition of the vehicle and surroundings around the vehicle may be displayed below the speedometer 50 at the position close to the speedometer 50. Alternatively, the graphic images 51 showing the condition of the vehicle and surroundings around the vehicle may be displayed above the speedometer 50 at the position close to the speedometer 50. In other words, the gauge of the speedometer 50 may be displayed on the upper or lower side of the graphic images 51.

Figure 11:
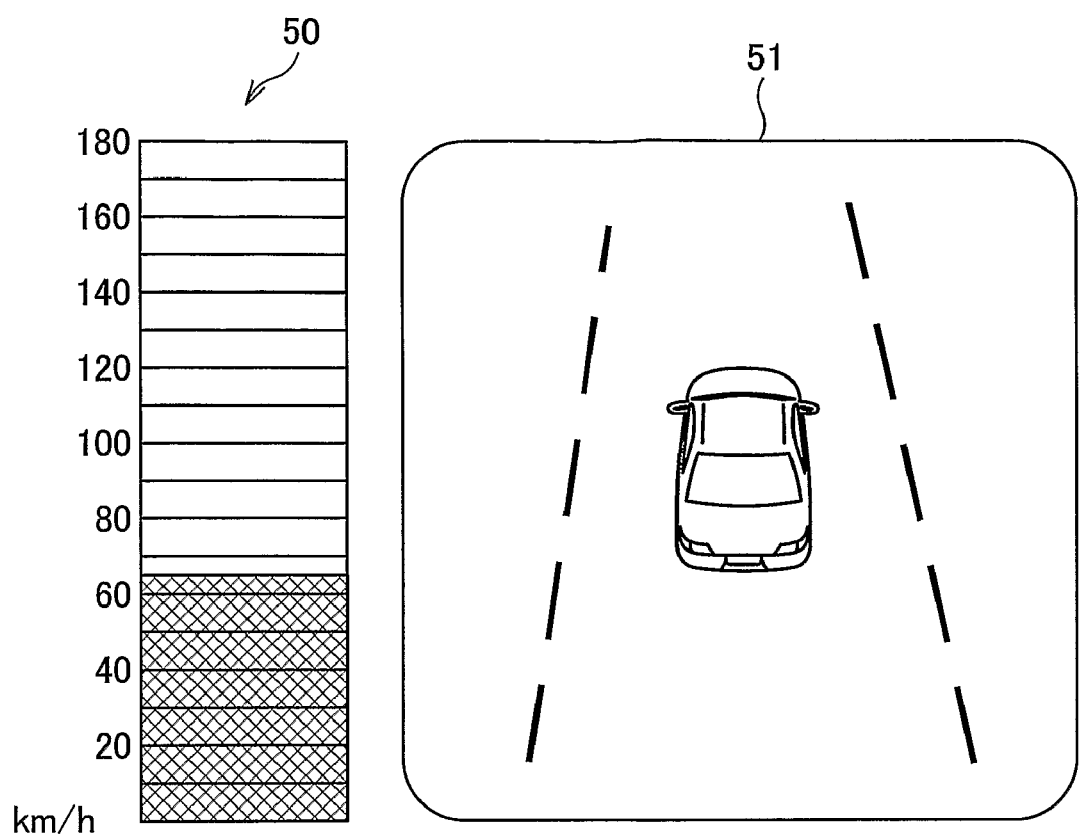
FIG. 11 is an explanatory view illustrating still another example of a display manner of images showing a speedometer, a vehicle, and surroundings around the vehicle in the condition detection and display system according to one embodiment of the present invention.

Still further, as illustrated in FIG. 11, in the arrangement in which the speedometer 50 is realized by a gauge extending up and down, the graphic images 51 showing the condition of the vehicle and the surroundings around the vehicle may be displayed at the position close to the speedometer 50 on the left or right side. In other words, the gauge of the speedometer 50 may be displayed on the left or right side of the graphic images 51.

The sets of information displayed as the condition of the vehicle and the surroundings around the vehicle are not limited to the above-described sets of information. Apart from the direction sensor 31, the in-vehicle temperature sensor 32, the tire pressure sensor 33, and the fuel sensor 34, examples of the internal condition sensors 3 may include: a door open/close sensor for detecting opening and closing of the doors; a door lock sensor for detecting locking of the door; a parking brake sensor for detecting the state of the parking brake; a protrusion sensor for detecting the presence or absence of an object (e.g. arms and legs of a passenger) protruded from windows of the vehicle; light sensors for detecting whether lights such as brake light, turn-signal lights, and headlights can be turned on; a seat belt sensor for detecting whether the driver wears a seat belt; a steering sensor for detecting a steering angle of a steering wheel; a gearshift sensor for detecting where the gearshift lever is put into; fluid sensors for detecting a remaining amount of fluid such as brake oil, engine cooling water, power steering fluid, battery fluid, and washer fluid; an oil deterioration sensor for detecting deterioration of an engine oil; a tread depth sensor for detecting remaining tread depths of the tires; a brake pad wear sensor for detecting a wear of brake pads; an electrical system abnormality sensor for detecting the presence or absence of abnormality in an electrical system; a battery sensor for detecting the state of charge on a battery; and a water temperature sensor for detecting a water temperature of the engine cooling water (all of which are not shown). That is, the internal condition sensors 3 include all sorts of sensors which detect the condition of the vehicle. The present invention may be arranged such that from the detection results obtained by these sensors, the driver extracts information that the driver should pay attention to so that the extracted information is displayed with a graphic image of the vehicle at the position close to the speedometer.

A timing of detection by the internal condition sensors 3 and the external condition sensors 4 is not particularly limited. The timing of detection can be set in accordance with properties of the sensors and characteristics of objects to be detected by the sensors. For example, as to objects to be detected at the time of start of the vehicle, detection may be carried out in synchronization with a timing of turn-on of the ignition key, or a timing of door opening/closing or unlocking. As to objects to be monitored all the time in traveling, detection may be carried out all the time in traveling.

According to the above descriptions of the present system 100, at the time of start of the parked or stationary vehicle, on the basis of a detection result obtained by the distance sensor 42, widths of roads around the vehicle are determined, and the direction of the vehicle with respect to the widest road (main road) among the roads around the vehicle is determined so that the direction of the displayed graphic image of the vehicle is changed in accordance with the direction of the vehicle with respect to the main road. However, the present invention is not limited to this. For example, the present invention may be arranged such that from information stored in the car navigation information database 13, the widest road among the roads around the vehicle is grasped, and the direction of the displayed graphic image of the vehicle is changed in accordance with the direction of the vehicle with respect to the widest road.

Further, the present invention may be arranged such that in traveling, for example, on the basis of the capturing result obtained by the omnidirectional camera 1, the control section 5 determine road markings, such as white lines and oblique lines, marked on the roads so as to change the direction of the graphic image of the vehicle in accordance with the direction of the road marking. Note that, determination of road markings, such as white lines and oblique lines, marked on the roads is not limited to the determination on the basis of the capturing result obtained by the omnidirectional camera 1. For example, a road marking sensor (road type symbol detecting device (not shown)) for detecting road markings may be provided additionally.

Further, the present invention may be arranged such that the direction sensor 31 detects a direction of the front end of the vehicle, and the direction of the graphic image of the vehicle is changed in accordance with the detected direction. For example, in the case where the front end of the vehicle turns to the north, the graphic image of the vehicle can be displayed so that its front end is turned up.

Still further, the present invention may be arranged such that a speed of the vehicle and road markings, such as white lines and oblique lines, marked on the roads are detected, and on the basis of the detection results, a graphic image corresponding to the detected road marking is displayed, with the graphic image of the vehicle, at the position close to the speedometer.

Yet further, for example, the present invention may be arranged such that on the capturing result obtained by the omnidirectional camera 1 or others, the control section 5 determines whether the vehicle is in a stopping state or moving (traveling) state so as to change images showing the condition of the vehicle and surroundings around the vehicle in accordance with the determined state. For example, the present invention may be arranged such that when the vehicle is in the stopping state, the image of the vehicle is displayed with an image of a garage, and when the vehicle is in the moving state, the image of white lines on the road is displayed with a relative movement with respect to the image of the vehicle.

Further, in the present system 100, the present invention may be arranged such that data addition and modification is carried out with respect to the image database 6 storing the graphic image of the vehicle. That is, the present invention may be arranged such that the graphic images showing the condition of the vehicle and surroundings around the vehicle are freely changed by the driver. For example, the present invention may be arranged such that through the input section 10, the driver can provide an instruction to change the graphic images, stored in the image database, showing the condition of the vehicle and surroundings around the vehicle. In an alternative example, a personal computer, an external memory, or the like may be connected to the external connection terminal 12 so as to receive information on change of the graphic images, stored in the image database, showing the condition of the vehicle and surroundings around the vehicle. In another alternative example, the present system 100 may be connected via the communications section 11 to the Internet so as to download the information on change. In still another example, the image database may store in advance multiple types of graphic images of the vehicle so that the driver selects an appropriate one from among the graphic images. Alternatively, a large-capacity HD (hard disk) storing sets of image information that are able to be changed may be provided separately so that an appropriate one is selected from among data stored in advance in the HD.

Thus, with the arrangement in which the graphic images showing the condition of the vehicle and the surroundings around the vehicle are able to be changed, it is possible to display a graphic image corresponding to the condition of the vehicle, for example, in a case where the vehicle has been customized and changed its shape, or in a case where the vehicle has been changed its color by painting. Further, the surroundings around the vehicle can be changed into a visual form that is easy to recognize for the driver.

Further, the present invention may be arranged such that the driver can customize not only the graphic images showing a condition of the vehicle and surroundings around the vehicle, but also designs of items displayed on the liquid crystal panel 7. For example, a size, shape, color, and located position (displayed position) of instruments including speedometer, tachometer, and fuel gauge may be changed. Note that, to ensure a required visibility, a displayed item, such as speedometer, that is important to realize safe driving is preferably able to be changed within a predetermined condition limit. For this arrangement, for example, the present system 100 may be provided with a database (not shown) that stores change allowable limits respectively corresponding to the displayed items. Alternatively, such a database may be provided on a server, and the driver accesses to the server via communications lines to change designs of the items to be displayed on the liquid crystal panel 7. With this arrangement, the driver can select a desired display content within a change allowable limit. Alternatively, if the driver's instruction is beyond the change allowable limit, the driver's instruction may be corrected so as to be within a change allowable limit.

Further, in the present system 100, as the omnidirectional camera 1 used is a camera that is capable of capturing images in all directions at once. However, the omnidirectional camera 1 is not limited to this. For example, capturing images in all directions may be continuously carried out with a rotation of a camera capable of capturing images in particular directions about a rotation axis that is a direction vertical to the ground surface. Further, capturing may be carried out in the following manner: with a camera which captures in the direction vertical to the ground surface, a reflector that is capable of rotation about an axis that is a capturing direction of the camera is provided on the capturing axis of the camera at a predetermined tilt angle with respect to the capturing axis of the camera, and images that are reflected on the rotating reflector are captured by the camera.

In the present system 100, the omnidirectional camera 1 is provided on the roof of a vehicle. However, a setting position of the omnidirectional camera 1 is not limited to this. For example, the omnidirectional camera 1 may be provided on the bottom of a vehicle. Alternatively, the omnidirectional camera 1 may be stored in a vehicle and shown outside the vehicle for capturing of images in all directions, only when the capturing is carried out.

Further, the omnidirectional camera 1 is not necessarily composed of one camera. For example, the omnidirectional camera 1 may be composed of a plurality of cameras provided on a vehicle at different positions. With this arrangement, a combination of capturing results obtained by the plurality of cameras can be provided to the user as a capturing result in all directions. In this case, for example, the cameras may be diagonally provided on the left front corner and the right back corner of the vehicle, or provided on the right front corner and the left back corner of the vehicle. Alternatively, the cameras may be provided on the left front corner, the left back corner, the right front corner, and the right back corner of the vehicle. This arrangement allows for capturing images of blind spots with respect to a driver's seat, thus increasing a level of safety.

Still further, as the omnidirectional camera 1, an infrared camera may be used. Alternatively, lighting means for lighting a capturing area of the omnidirectional camera 1 may be provided. In these arrangements, it is possible to easily and reliably grasp the surroundings around the vehicle stationary or parked at night.

Yet further, in the present system 100, capturing images in all directions is carried out by using the omnidirectional camera 1. However, the present invention is not limited to this. For example, images of blind spots (e.g. spots that are hard for the driver to check with his/her eyes or a check through door mirrors, room mirror, and others, including front side, left back corner, right back corner, and back side of the vehicle) may be captured selectively.

Further, the present system 100, as described earlier, is provided with the liquid crystal panel 7 of a super wide (widthwise elongated) screen having an aspect ratio of 7:3 or greater. As compared with many conventional onboard display devices for navigation system and television having an aspect ratio of 4:3, the liquid crystal panel 7 is larger by an additional display area wider than a square having an aspect ratio of 3:3. The liquid crystal panel 7 allows for display of the speedometer in the additional display area wider than a square having an aspect ratio of 3:3. Incidentally, a round speedometer is typically used because of its most excellent visibility. The liquid crystal panel 7 allows such a speedometer to be displayed with an increased scale in the additional display area wider than a square with a full use of a shorter side. With this arrangement, this speedometer can be displayed with sufficient visibility, thus ensuring a high level of safety. That is, this arrangement achieves improved visibility in the concurrent display of a secondary image, such as navigation image, and a vehicle condition image showing a condition of a vehicle, such as speed of the vehicle and a remaining amount of fuel.

Recently, some display device for navigation system has an aspect ratio of 15:9. In this arrangement, the aspect ratio needs to be 24:9 or greater. Also, some display device for television has an aspect ratio of 16:9. In this arrangement, the aspect ratio needs to be 25:9 or greater.

Further, the liquid crystal panel 7 may be a combination of two identical panels each having an aspect ratio of 4:3, 15:9, or 16:9. With such an arrangement, it is possible to realize the liquid crystal panel 7 having an aspect ratio of 8:3, 30:9, or 32:9. In an alternative example, the liquid crystal panel 7 may be a combination of panels respectively having aspect ratios of 4:3 and 15:9, so as to have an aspect ratio of 27:9. In another alternative example, the liquid crystal panel 7 may be a combination of panels respectively having aspect ratios of 4:3 and 16:9, so as to have an aspect ratio of 28:9. In still another alternative example, the liquid crystal panel 7 may be a combination of two panels respectively having aspect ratios of 15:9 and 16:9, so as to have an aspect ratio of 31:9. Note that, the liquid crystal panel 7 has no particular limitation of an upper limit value of the aspect ratio, provided that the liquid crystal panel 7 has a length equal to or greater than a predetermined value on a shorter side and a resolution equal to or greater than a predetermined value.

Further, the liquid crystal panel 7 preferably has 468 or more scan lines parallel to the longer side. With this arrangement, the liquid crystal panel 7 can accommodate two display areas in W-QVGA format (Wide Quarter Video Graphics Array; 400 columns×234 rows) on top of each other. This enables the liquid crystal panel 7 to show a plurality of images, such as a combination of a navigation system image and a vehicle rearview image, while ensuring sufficient visibility.

In an arrangement of the liquid crystal panel 7 having 400 or more scan lines parallel to the longer side, an image captured by the omnidirectional camera 1 may be displayed in such a manner that a longer side of the image is parallel to a shorter side of the liquid crystal panel 7. In this case, for example, an image of left or right side of the vehicle, captured by the omnidirectional camera 1, is displayed with a resolution of WQVGA (400) on a longitudinal side (shorter side) of the liquid crystal panel 7, which increases visibility. This arrangement allows the use of an existing graphic chip, thus realizing a reduced manufacturing cost.

Further, in an arrangement of the liquid crystal panel 7 having 400 or more scan lines parallel to the longer side, an image captured by the omnidirectional camera 1 may be displayed in such a manner that a shorter side of the image is parallel to the shorter side of the liquid crystal panel 7. In this case, for example, a vehicle front view image or vehicle rear view image, captured by the omnidirectional camera 1, is displayed with a resolution of WQVGA (400) on a lateral side (longer side) of the liquid crystal panel 7, which increases visibility. Note that, in accordance with a capturing direction of an image captured by the omnidirectional camera 1, the captured image may be displayed on the liquid crystal panel 7 in either portrait or landscape orientation.

Further, in the present system 100, a displaying manner of instruments, such as speedometer, tachometer, and fuel gauge on the liquid crystal panel 7 may be changed in order to display an image captured by the omnidirectional camera 1 thereon. For example, a display area of these instruments may be reduced with visibility in such a manner that readouts of these instruments are given only in figures or in a straight-line shaped gauge. With this arrangement, the liquid crystal panel 7 gives the image captured by the omnidirectional camera 1 in a larger area thereof, so that the driver can grasp the surroundings around the vehicle more reliably.

In an arrangement in which a display area of the image captured by the omnidirectional camera 1 is variable, one side (one edge part) of the display area is preferably given at a fixed position even if the display area is varied in size. Variation in position of the display area without a baseline causes movement of the edge (end) of the displayed image. This could break a driver's concentration and decreases visibility. In view of this, in the arrangement in which the display area is variable, setting of a baseline (one side of the display area) that is fixed eliminates unwanted flickering image movements, thus realizing the liquid crystal panel 7 that allows the driver to comfortably check displayed images.

Further, in the present system 100, the liquid crystal panel 7 displays the images showing instruments required for driving, a condition of the vehicle, and surroundings around the vehicle, together with the image captured by the omnidirectional camera 1 and car navigation information. However, the present invention is not limited to this arrangement. For example, (i) a liquid crystal panel for displaying the images showing the instruments required for driving, the condition of the vehicle, and the surroundings around the vehicle and (ii) a liquid crystal panel for displaying the image captured by the omnidirectional camera 1 and car navigation information may be provided separately.

Still further, in the present system 100, instruments such as a speedometer are displayed on the liquid crystal panel 7. However, the present invention is not limited to this arrangement. For example, it may be arranged such that an analog speedometer is provided, and a liquid crystal panel that displays the graphic images showing the vehicle and the surroundings around the vehicle are provided at the position close to this speedometer.

Yet further, in the present system 100, the liquid crystal panel 7 is used as display means. However, the display means applicable to the present system 100 is not limited to the liquid crystal panel 7. For example, as the display means, an organic EL (Electro Luminescence) panel, a plasma display panel, a CRT (Cathode Ray Tube), or others may be used.

In the present system 100, emergency display means (fail-safe system) may be further provided. For example, the liquid crystal panel 7 might go out of order or might give a practically undesirable readout on speed of the vehicle due to a low temperature. Even in such cases, instruments such as a speedometer must be displayed properly for a safe driving of the driver. In view of this, the present system 100 may be provided with, for example, emergency display means (not shown) realized by a transparent EL panel. With this arrangement, even in the event of a breakdown or display failure in the liquid crystal panel 7, the emergency display means can display the instruments such as speedometer, thus allowing the driver to drive safely.

Further, in the present system 100, the liquid crystal panel displays the images showing instruments, such as a speedometer, a condition of the vehicle, and surroundings around the vehicle together with the image captured by the omnidirectional camera 1 and car navigation information. In this arrangement, for example, visibility of the instruments could decrease if the display area of the instruments is much lower in brightness than other display area. To avoid such a circumstance, it is preferable to prevent the display area of the instruments from being lower in brightness than other display area. For example, if the display area of the instruments has been lower in brightness than other display area, other display area may be set to be lower in brightness than the display area of the instruments. Alternatively, the brightness of other display area may be limited to be equal to or less than a threshold value so that the brightness of other display area is not of a higher value than a predetermined threshold value.

Still further, in the present system 100, as the input section 10, a touch panel provided on the liquid crystal panel 7 is used. However, an arrangement of the input section 10 is not limited to this. For example, as the input section 10 that is special for the present system 100, a key input device, a mouse, and others may be provided additionally. The input section 10 may also serve as input sections (operation sections) of an audio system and a car navigation system if the present system 100 offers these systems. In addition, the input section 10 may also serve as operation means of a system in which angles of door mirrors (fender mirrors) are power-adjustable if the present system 100 offers this system.

Yet further, the present system 100 is provided with the distance sensor 42 for detecting a distance between the vehicle and other object and the relative speed sensor 43 for detecting a relative speed of other object relative to the vehicle. However, the present invention is not limited to this. For example, on the basis of image data captured by the omnidirectional camera 1, the control section 5 may determine a distance between the vehicle and other object and a relative speed of other object relative to the vehicle.

Further, according to the above descriptions, the battery for engine start is used as power to the present system 100.

However, the present invention is not limited to this. Power supply means for supplying power to the present system 100 may be changed appropriately. For example, power supply means exclusive to the present system 100 may be provided.

Still further, in the present system 100, connection through the communications section 11 to a communications network such as Internet allows the driver in the stationary or parked vehicle, for example, to check information on his/her destination before starting. For example, if the destination is a movie theater, the driver can check in advance what movies are on in the movie theater and information on traffic jams of the way to the movie theater. In addition, the driver can purchase movie tickets and reserve the seats. Further, the driver can make a reservation for meals at a restaurant and performs a search from the menu of the restaurant for ordering.

Yet further, the present invention may be arranged such that various sets of application software for personal computers can be executed through the present system 100. This means that the liquid crystal panel 7 also serves as a monitor for personal computer. In this case, it is possible to hold a network meeting through the present system 100. Note that, in the situation where various sets of application software can be executed through the present system 100, for example, various applications may be displayed on a full screen (whole display area) of the liquid crystal panel 7.

Further, an instruction to start the present system 100 may be provided via the communications lines. Image data captured by the omnidirectional camera 1 may be transmittable to external entities via the communications lines. This arrangement can be used in such a manner that the present system 100 is started at a location remote from the vehicle, images of surroundings around the vehicle are captured, and the captured images are checked at the location remote from the vehicle.

Still further, according to the above descriptions, the present system 100 is installed in vehicles. The vehicles herein include, in addition to automobiles, all land traveling means that needs driver's operation for traveling, including motorcycles and bicycles. Moreover, the present system 100 is applicable, apart from the vehicles, to all traveling means that needs driver's operation, including helicopters, airplanes, and ships, for example.

Conventionally, as to displays on the meters of a car, information such as traveled distance was given in the center of the speedometer. However, the information such as traveled distance is necessary only in a limited situation. It can be said that the present invention has been achieved in view of this point.

The present invention is not limited to the aforementioned embodiments and is susceptible of various changes within the scope of the accompanying claims. An embodiment obtained by suitable combinations of technical means disclosed in the different embodiments also fall within the technical scope of the present invention.

For example, the control section 5 of the present system 100 may be arranged by hardware logic or may be realized by a CPU executing software in the following manner.

That is, the present system 100 includes: the CPU executing instructions of a control program for realizing the aforesaid functions; ROM for storing the control program; RAM for spreading out the control program; a storage device (storage medium) such as memory that stores the control program and various types of data; and others. With this arrangement, the objective of the present invention is realized in the following manner: a storage medium in which program codes (e.g. an executable code program, intermediate code program, and source program) of the control program for the present system 100 that is software for realizing the aforesaid functions are stored in a computer-readable manner are supplied to the present system 100, and the computer (or CPU, MPU) reads out the program codes from the storage medium and executes the same.

The storage medium may be tape based, such as a magnetic tape or cassette tape; disc based, including a magnetic disc such as a flexible disc or hard disk and an optical disc such as CD-ROM/MO/MD/DVD/CD-R; card based, including an IC card (including a memory card) and an optical card; or a semiconductor memory, such as a mask ROM, EPROM, EEPROM, and a flash ROM.

Alternatively, the present system 100 may be arranged so as to be connectable to the communications network so that the program codes are supplied to the present system 100 via the communications network. Nonexclusive examples of the communication network includes the Internet, intranet, extranet, LAN, ISDN, VAN, CATV communication network, virtual private network, telephone network, mobile communication network, and satellite communication network. Nonexclusive examples of transmission media constituting the communications network are cables such as IEEE1394, USB, power-line carrier, cable TV lines, telephone lines, ADSL lines, and wireless connections such as IrDA and remote control using infrared light, Bluetooth®, 802.11, HDR, mobile phones, satellite connections, and terrestrial digital broadcasting. The present invention can be realized by a carrier wave or a series of signals embodying the program codes through electronic transmissions.

INDUSTRIAL APPLICABILITY

A condition detection and display system and a condition detection and display method of the present invention is applicable to all traveling means that needs driver's operation for traveling, including automobiles, motorcycles, bicycles, helicopters, airplanes, and ships.

The invention claimed is:

1. A condition detection and display system, provided in a traveling means that needs operation of a driver for traveling, for detecting a condition of the traveling means and surroundings around the traveling means and notifying the driver of the detected condition of the traveling means and surroundings around the traveling means, the system comprising:

a display configured to display images showing the condition of the traveling means, the surroundings around the traveling means, and a speedometer that gives readouts on speed of the traveling means;

a width detecting unit configured to detect widths of roads around the traveling means, which is a vehicle; and a direction detecting unit configured to detect a direction of a front end of the traveling means with respect to a widest road among the roads around the traveling means; wherein:

the images showing the condition of the traveling means, the surroundings around the traveling means, and the speedometer are displayed in such a manner that the images showing the condition of the traveling means and the surroundings around the traveling means are directly adjacent to the image of the speedometer without any element between the images showing the condition of the traveling means and the surroundings around the traveling means and the image of the speedometer;

the images showing the condition of the traveling means and the surroundings around the traveling means contain an image of the traveling means; and in accordance with the direction of the front end of the traveling means with respect to the widest road, a direction of the image of the traveling means is changed.

2. The condition detection and display system according to claim 1, wherein:
the speedometer is displayed around a periphery or a part of the periphery of the images showing the condition of the traveling means and the surroundings around the traveling means.

3. The condition detection and display system according to claim 1, wherein:
the traveling means includes tires that transfer a drive force to a ground, and a pneumatic pressure detecting unit configured to detect air pressure in the tires, wherein:
if the air pressure in the tires is equal to or lower than a predetermined value, an image for notifying the driver of decrease in air pressure in the tires is displayed.

4. The condition detection and display system according to claim 1, further comprising:
a distance detecting unit configured to detect a distance between the traveling means and another object; and
a shape grasping module configured to grasp a shape of the other object,
wherein:
if there is an object approaching the traveling means at a distance equal to or less than a predetermined value from the traveling means, an image corresponding to the shape of the object is displayed.

5. The condition detection and display system according to claim 4, wherein:
the predetermined value varies depending upon a speed of the traveling means and/or a direction where the other object is located with respect to the traveling means.

6. The condition detection and display system according to claim 1, further comprising:
a relative speed detecting unit configured to detect a relative speed of another object relative to the traveling means; and
a shape grasping module configured to grasp a shape of the other object;
wherein:
if there is an object approaching the traveling means at a relative speed equal to or higher than a predetermined value, an image corresponding to the shape of the object is displayed.

7. The condition detection and display system according to claim 1, further comprising:
a communications unit configured to receive Intelligent Transport System (ITS) information,
wherein:
if the received ITS information contains information on surroundings around the traveling means, an image showing the surroundings around the traveling means, in accordance with the ITS information, is displayed at the position close to the speedometer.

8. The condition detection and display system according to claim 1, further comprising:
a detecting unit configured to detect whether the traveling means is moving,
wherein:
the images showing the condition of the traveling means and the surroundings around the traveling means are different depending upon a detection result obtained by the detecting unit configured to detect whether the traveling means is moving.

9. The condition detection and display system according to claim 1, further comprising:
A detecting unit configured to detect a road marking marked on the road on which the traveling means, which is a vehicle, is moving,
wherein:
a detected road marking is displayed as the image showing the surroundings around the traveling means.

10. The condition detection and display system according to claim 9, further comprising:
A detecting unit configured to detect a direction of a front end of the traveling means with respect to the road marking,
wherein:
the images showing the condition of the traveling means and the surroundings around the traveling means contain an image of the traveling means, and
a direction of the image of the traveling means is changed in accordance with the direction of the front end of the traveling means with respect to the road marking.

11. The condition detection and display system according to claim 1, wherein:
the images showing the condition of the traveling means and the surroundings around the traveling means are graphic images.

12. The condition detection and display system according to claim 11, wherein:
the graphic images are able to be changed.

13. The condition detection and display system according to claim 12, further comprising:
an interface for receiving an instruction to change the graphic image.

14. The condition detection and display system according to claim 1, wherein:
the traveling means includes an engine as driving means, and a detecting unit configured to detect an instruction to start the engine,
wherein:
the images showing the condition of the traveling means and the surroundings around the traveling means are displayed in synchronization with the instruction to start the engine.

15. A condition detection and display method, for use in a traveling means that needs operation of a driver for traveling, for detecting a condition of the traveling means and surroundings around the traveling means and notifying the driver of the detected condition of the traveling means and surroundings around the traveling means, comprising:
a width detecting unit configured to detect widths of roads around the traveling means, which is a vehicle; and
a direction detecting unit configured to detect a direction of a front end of the traveling means with respect to a widest road among the roads around the traveling means; wherein
images showing the condition of the traveling means, the surroundings around the traveling means, and a speedometer are displayed in such a manner that the images showing the condition of the traveling means and the surroundings around the traveling means are directly adjacent to the image of the speedometer without any element between the images showing the condition of the traveling means and the surroundings around the traveling means and the image of the speedometer;
the images showing the condition of the traveling means and the surroundings around the traveling means contain an image of the traveling means; and in accordance with the direction of the front end of the traveling means with respect to the widest road, a direction of the image of the traveling means is changed.

16. A tangible computer-readable storage medium storing a control program for a condition detection and display system, provided in a traveling means that needs operation of a driver for traveling, for detecting a condition of the traveling means and surroundings around the traveling means and notifying the driver of the detected condition of the traveling means and surroundings around the traveling means, the system comprising:

- a display configured to display images showing the condition of the traveling means and the surroundings around the traveling means, and a speedometer that gives readouts on speed of the traveling means;
- a width detecting unit configured to detect widths of roads around the traveling means, which is a vehicle; and
- a direction detecting unit configured to detect a direction of a front end of the traveling means with respect to a widest road among the roads around the traveling means; wherein the control program causes a computer to control the display means to display the images showing the condition of the traveling means, the surroundings around the traveling means, and the speedometer in such a manner that the images showing the condition of the traveling means and the surroundings around the traveling means are directly adjacent to the image of the speedometer without any element between the images showing the condition of the traveling means and the surroundings around the traveling means and the image of the speedometer;

the images showing the condition of the traveling means and the surroundings around the traveling means contain an image of the traveling means; and in accordance with the direction of the front end of the traveling means with respect to the widest road, a direction of the image of the traveling means is changed.

\* \* \* \* \*